United States Patent
Ogawa et al.

(10) Patent No.: US 11,746,718 B2
(45) Date of Patent: Sep. 5, 2023

(54) CONTROL DEVICE, CONTROL METHOD, AND RECORDING MEDIUM

(71) Applicants: TRANSTRON INC., Yokohama (JP); KOGAKUIN UNIVERSITY, Tokyo (JP)

(72) Inventors: Masatoshi Ogawa, Yokohama (JP); Takuma Degawa, Yokohama (JP); Masakazu Mukai, Shinjuku (JP); Shigeaki Kurita, Yokohama (JP)

(73) Assignees: TRANSTRON INC., Yokohama (JP); KOGAKUIN UNIVERSITY, Tokyo (JP)

( * ) Notice: Subject to any disclaimer, the term of this patent is extended or adjusted under 35 U.S.C. 154(b) by 0 days.

(21) Appl. No.: 17/973,082

(22) Filed: Oct. 25, 2022

(65) Prior Publication Data

US 2023/0133128 A1    May 4, 2023

(30) Foreign Application Priority Data

Oct. 29, 2021   (JP) ................................ 2021-177302

(51) Int. Cl.
F02D 41/00       (2006.01)

(52) U.S. Cl.
CPC ..... F02D 41/0072 (2013.01); F02D 41/0007 (2013.01); F02D 41/0077 (2013.01)

(58) Field of Classification Search
CPC .. F02D 41/1402; F02D 35/028; F02D 35/023; F02D 41/009; F02D 2250/14;
(Continued)

(56) References Cited

U.S. PATENT DOCUMENTS 5,531,110 A * 7/1996 Ohashi ............... B60C 23/00
                                                        73/146
2007/0143074 A1   6/2007 Gallestey et al.
(Continued)

FOREIGN PATENT DOCUMENTS

| EP | 3 767 546 A1 | 1/2021 |
|----|----|----|
| JP | 2008-502034 A | 1/2008 |
| WO | WO 03/065135 A1 | 8/2003 |

OTHER PUBLICATIONS

Extended European Search Report dated Mar. 30, 2023 in European Patent Application No. 22203803.6.
(Continued)

*Primary Examiner* — John Kwon
(74) *Attorney, Agent, or Firm* — STAAS & HALSEY LLP

(57) ABSTRACT

A control device includes a controller configured to: obtain a driving condition and an actual value of a controlled amount of an engine; use a transformed engine model to calculate an estimate value of a future controlled amount, from the obtained driving condition and a candidate value of an operation amount for controlling the controlled amount, the transformed engine model in which an activation function of each neuron is transformed using a linear inequality function having a binary variable, the transformed engine model for which a weight coefficient, bias, and upper and lower limits of an input/output variable of the each neuron are set based on an engine model that has a multilayer neural structure and the activation function of a ReLU structure, receives the driving condition and operation amount as input, and predicts dynamic characteristics of the engine; determine a value of the operation amount, based on error between the calculated estimate value and a target value of the controlled amount identified from the driving condition.

12 Claims, 17 Drawing Sheets

(58) Field of Classification Search
CPC ....... F02D 2041/1433; F02D 2200/024; F02D 2250/18
See application file for complete search history.

(56) References Cited

U.S. PATENT DOCUMENTS

| | | | | |
|---|---|---|---|---|
| 2013/0062941 A1* | 3/2013 | Yamamoto | ............ | B60L 3/0092 307/10.6 |
| 2013/0296132 A1* | 11/2013 | Doering | ................ | B60W 10/10 477/86 |
| 2015/0072832 A1* | 3/2015 | Reed | ..................... | B60W 20/40 180/65.265 |
| 2017/0233668 A1* | 8/2017 | Kornfield | .............. | C10L 1/2366 44/343 |
| 2019/0003411 A1* | 1/2019 | Aso | ....................... | F02D 35/023 |

OTHER PUBLICATIONS

Masakazu Muaki et al., "A Study on Model Predictive Control of Diesel Engine Using Deep Neural Network Model" 64th Joint Conference on Automatic Control (Nov. 13-14, 2021) 2H1-1; pp. 829-830; 2 pages English translation.

Kyohei Yamaguchi et al., "Fast Nonlinear Model Predictive Control Using Machine Learning for Air Path Control of a Diesel Engine" SAE International® SAE Powertrains, Fuels & Lubricants Digital Summit; Sep. 28-30, 2021; pp. 1-31.

Justin Katz et al.; "The Integration of Explicit MPC and ReLU based Neural Networks" Science Direct; IFAC PapersONLine 53-2; Jan. 1, 2020; pp. 11350-11355.

* cited by examiner

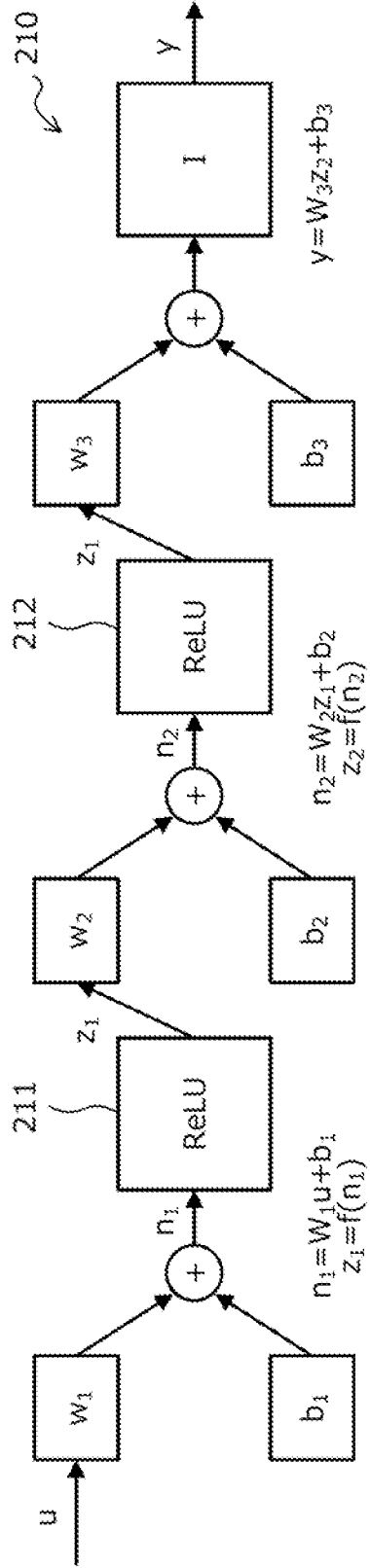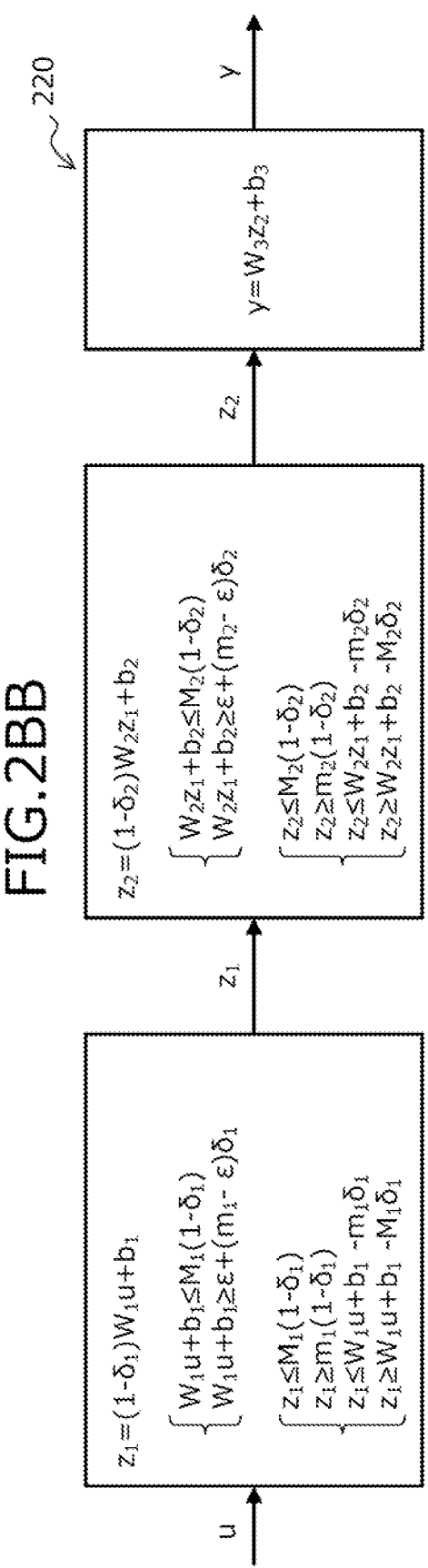

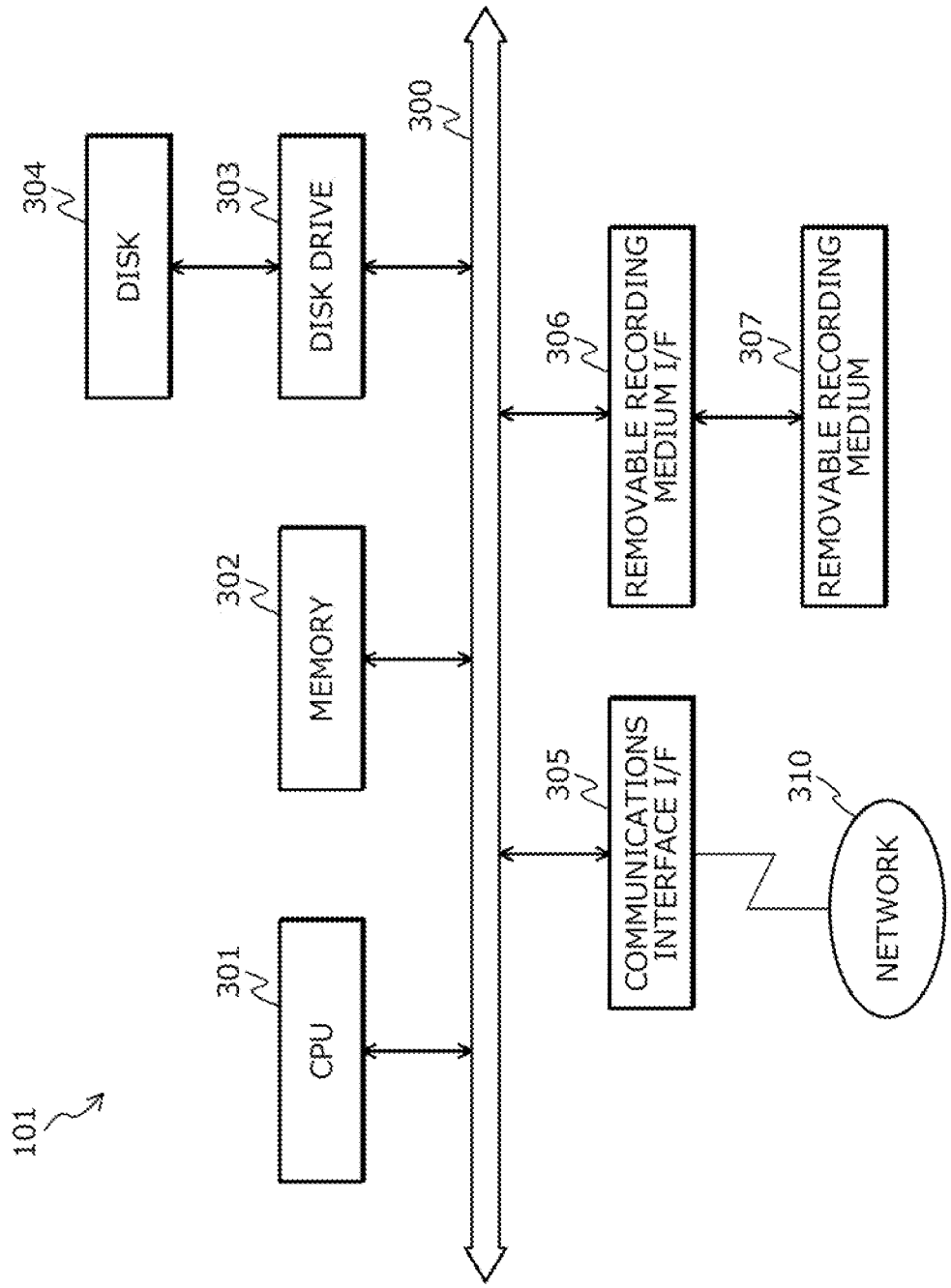

CONTROL DEVICE, CONTROL METHOD, AND RECORDING MEDIUM

CROSS REFERENCE TO RELATED APPLICATIONS

This application is based upon and claims the benefit of priority of the prior Japanese Patent Application No. 2021-177302, filed on Oct. 29, 2021, the entire contents of which are incorporated herein by reference.

FIELD

Embodiments discussed herein relate to a control device, a control method, and a recording medium.

BACKGROUND

Conventionally, in the control of automotive engines, efforts are being made to realize high performance control by using deep learning of artificial intelligence (AI) to reproduce an engine model. The control of automotive engines, for example, is realized by using a multi-layered neural network (NN) model (multi-input and multi-output engine model) to perform optimal control of multiple variables.

According to one conventional technique, for example, to model an industrial process, two interconnected mixed logical dynamical (MLD) subsystems are merged to build a single integrated MLD system. For example, refer to Published Japanese-Translation of PCT Application, Publication No. 2008-502034.

SUMMARY

According to an aspect of an embodiment, a control device includes a memory; and a processor coupled to the memory. The processor is configured to: obtain a driving condition and an actual value of a controlled amount of an engine under control; calculate an estimate value of a future controlled amount, from the obtained driving condition and a candidate value of an operation amount for controlling the controlled amount, the processor using a transformed engine model to calculate the estimate value, the transformed engine model in which an activation function of each neuron is transformed using a linear inequality function having a binary variable, the transformed engine model for which a weight coefficient, bias, and upper and lower limits of an input/output variable of the each neuron are set based on an engine model that has a multilayer neural structure and the activation function of a ReLU structure, receives the driving condition and the operation amount of the engine as input, and predicts dynamic characteristics of the engine; determine a value of the operation amount for controlling the controlled amount, based on an error between the calculated estimate value of the controlled amount and a target value of the controlled amount identified from the driving condition; and output the determined value of the operation amount.

An object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2BA is a diagram of an example of engine model transformation.

FIG. 2BB is another diagram of the example of engine model transformation.

FIG. 3 is a block diagram depicting an example of a hardware configuration of a control device 101.

DESCRIPTION OF THE INVENTION

First, problems associated with the conventional technique are discussed. In the convention technique, computation to optimally control the variables used in the multi-layered neural network model takes a lot of time and thus, controlling the engine in real-time is difficult.

Embodiments of a control device, a control method, and a control program according to the present invention are described in detail with reference to the accompanying drawings.

Figure 1:
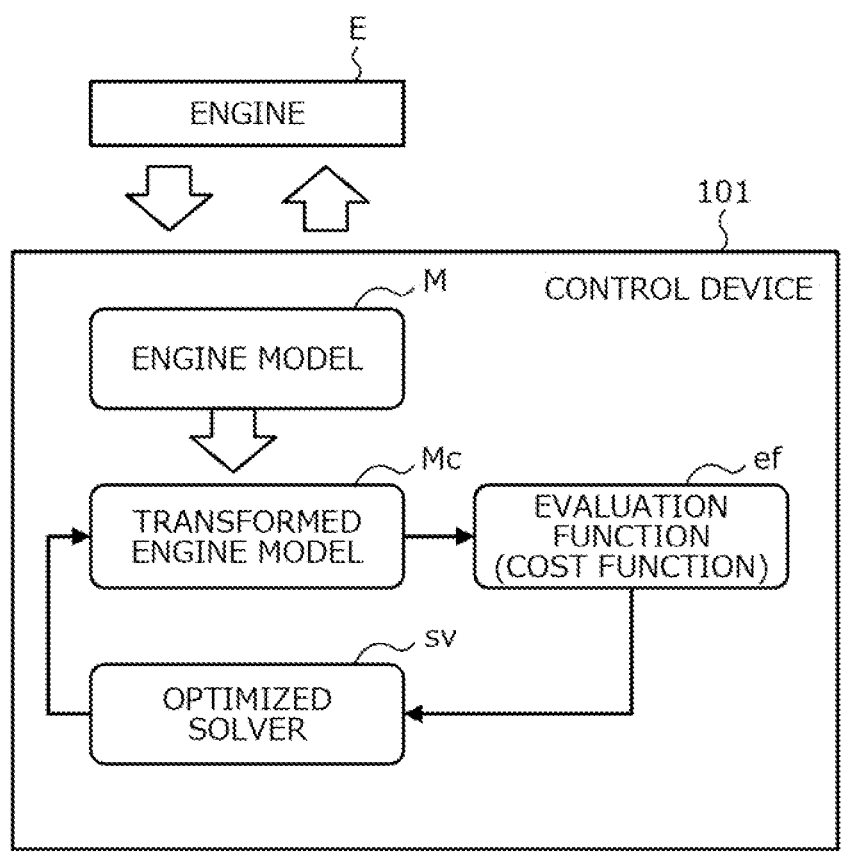
FIG. 1 is a diagram depicting an example of a control method according to a first embodiment.

FIG. 1 is a diagram depicting an example of a control method according to a first embodiment. In FIG. 1, a control device 101 is a computer that controls an engine E. The engine E, for example, is a gasoline engine or a diesel engine of a vehicle, or the like. Control of the engine E is the control of, for example, intake manifold pressure (MAP), intake air volume (MAF), intake manifold oxygen concentration, etc.

Here, control of an automotive engine may be performed using a multi-layered neural network (NN) engine model. On the other hand, to accurately reproduce complex phenomena of an automotive engine, the number of variables to be considered increases, whereby the scale of the engine model increases. Thus, in the conventional technique, in an instance in which optimal control of multiple variables is performed using an engine model a lot of time is necessary.

Further, an existing engine model is a non-linear, dynamic system that includes characteristics such as a primary delay, a secondary delay, and deadtime, and it is difficult to derive mathematical models of inverse functions by mathematical processing. Thus, a problem arises in that this problem cannot be solved analytically by a mathematical process and the computational load is high. Therefore, with the conventional technique, an engine control unit is equipped with an engine model and on-board control in real-time is difficult.

Thus, in the first embodiment, an engine model M having an activation function of a ReLU structure is described in terms of a control method that realizes high performance and high-speed engine control by using an engine model Mc that is transformed using a linear inequality function containing a binary variable, to thereby estimate a value for a controlled amount from driving conditions and an operation amount and to search for an operation amount that is a target amount of the controlled amount. Hereinafter, an example of processing by the control device 101 is described.

The control device 101 obtains an engine model Mc that is the engine model M after transformation. The engine model M is a model that predicts dynamic characteristics of the engine E under control. The engine model M has an activation function of a ReLU (rectified linear unit, normalized linear function) structure and a multilayer neural structure.

The ReLU structure is a function whose output value is 0 when an input value input to the function is 0, the output value varying linearly when the input value is greater than 0. The engine model M receives driving conditions and an operation amount of the engine E as input and outputs a value (predicted value) of a future controlled amount. The driving conditions of the engine E are, for example, engine rotation speed and a fuel injection amount.

The controlled amount of the engine E is, for example, the intake manifold pressure (MAP), the intake air volume (MAF), the intake manifold oxygen concentration, etc. The operation amount of the engine E is, for example, an operation amount of an actuator for controlling the controlled amount such as turbo airflow, throttle airflow, and EGR (Exhaust Gas Recirculation) airflow.

Dynamic characteristics of the engine E may be reproduced by the engine model M with accuracy. On the other hand, when the engine model M is used as it is for engine control, the computation time for optimal control may increase. Thus, to realize high performance and high-speed engine control, the control device 101 obtains the transformed engine model Mc, which is the engine model M that has been transformed.

The transformed engine model Mc is a model for which a weight coefficient, bias, and upper and lower limits of an input/output variable of each neuron (node) are set based on the engine model M and for which an activation function of each neuron has been transformed using a linear inequality function containing a binary variable. A weight coefficient and bias represent a relationship between the input and output of each neuron (node). A weight coefficient indicates a weight for input. Bias is used to bias an input value within a certain range.

An input/output variable, for example, is a variable input to the model itself, a variable output from the model itself, a variable output from each neuron in the model, etc. The upper and lower limits of an input/output variable, for example, are obtained by providing an exhaustive test pattern such as a chirp signal or amplitude pseudo random binary signal (APRBS) to the engine model M and are set based on a maximum value and a minimum value of each input/output variable.

Figure 2A:
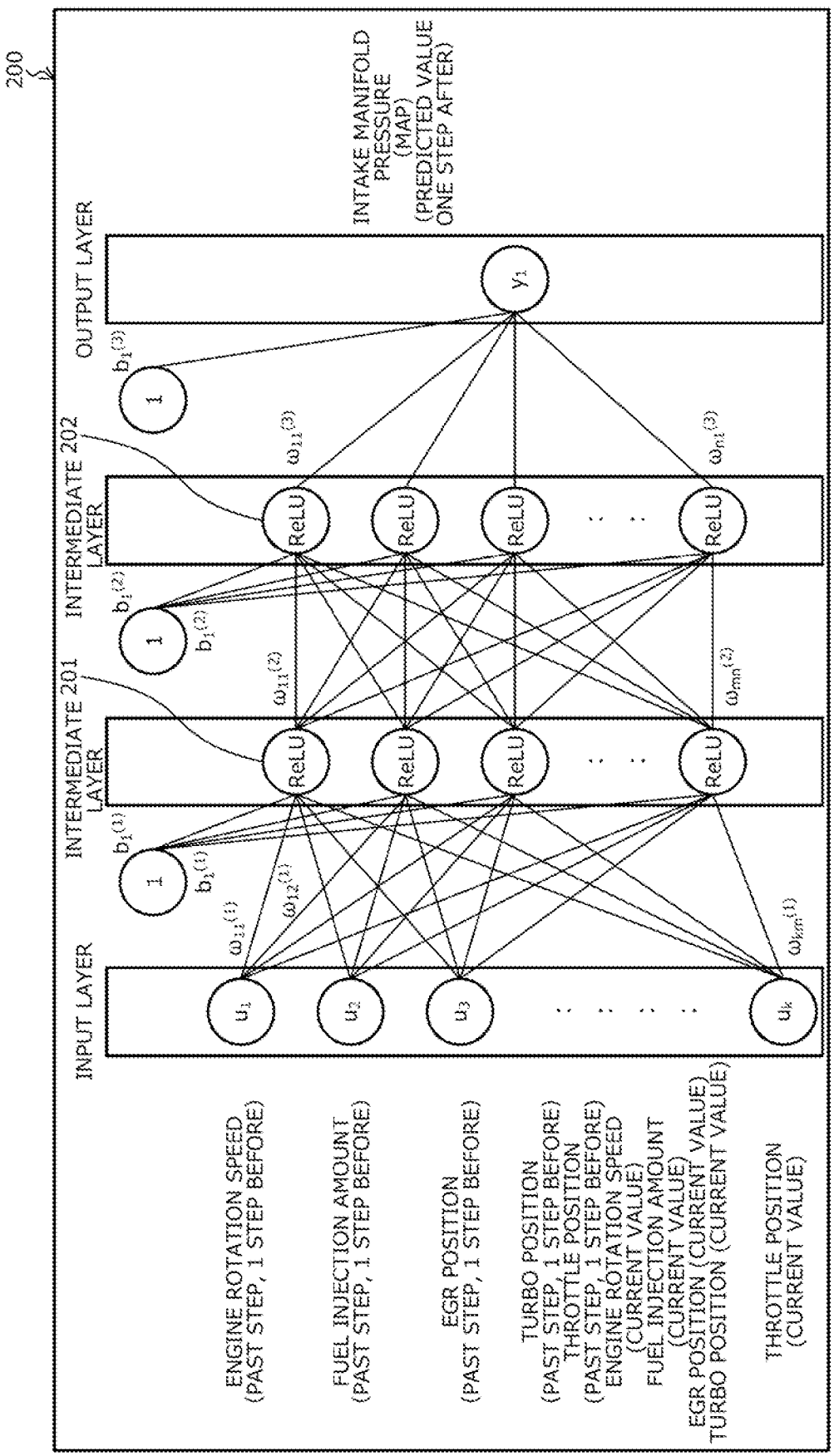
FIG. 2A is a diagram depicting an example of an engine model.

Here, an example of engine model transformation is described using FIGS. 2A and 2B. The engine model, for example, is created in advance.

FIG. 2A is a diagram depicting an example of the engine model. In FIG. 2A, an engine model 200 is an example of the engine model M and has an activation function of a ReLU structure and a multilayer neural structure. The engine model 200 receives inputs of multiple driving conditions and operation amounts of the engine E and outputs a future controlled amount.

Here, the driving conditions are engine rotation speed (current value, past value) and fuel injection amount (current value, past value). Further, the operation amounts are the turbo position (current value, past value), the throttle position (current value, past value), and the EGR position (current value, past value). The past value, for example, is the value one step before. Further, the controlled amount, for example, is the intake manifold pressure (MAP) (predicted value one step after).

In the engine model 200, for example, nodes 201, 202 are examples of neurons including a ReLU function. The ReLU function is the activation function of a ReLU structure. Further, $\omega_{11}^{(1)}$ indicates a weight applied to input to the node 201 from $u_1$. Further, $b_1^{(1)}$ indicates bias of the node 201.

FIGS. 2BA and 2BB are diagrams of an example of engine model transformation. In FIG. 2BA, an engine model 210 is a simplified depiction of the engine model 200 depicted in FIG. 2A. In FIG. 2BA, a portion of the engine model 210 is extracted and displayed.

In the engine model 210, for example, a ReLU function 211 indicates an activation function of the node 201 (refer to FIG. 2A). "$w_1$" indicates a weight applied to input to the node 201 from u. "$b_1$" indicates bias of the node 201. Further, a ReLU function 212 indicates an activation function of the node 202 (refer to FIG. 2A). "$w_2$" indicates a weight applied to input to the node 202 from the node 201. "$b_2$" indicates bias of the node 202. Further, "I" indicates a linear function.

The control device 101, for example, uses propositional logic to transform each ReLU function. A ReLU function, for example, is expressed using formula (1) below.

$$y=f(x)=\max\{0,x\}=\{x(x>0)/0(x\leq 0)\} \quad (1)$$

To express conditions of case division, the control device 101 substitutes a binary variable $\delta$ into the ReLU function as shown in formulae (2) and (3) below. The binary variable $\delta$ is a variable (0-1 variable) that takes on only two values, "0" and "1".

$$[f(x)\leq 0]\Leftrightarrow[\delta=1] \quad (2)$$

$$[f(x)>0]\Leftrightarrow[\delta=0] \quad (3)$$

The propositional logic described above is equivalent to true instances of inequalities (4) and (5) below. Where, M is a maximum value of f(x). "m" is a minimum value of f(x). "ε" is computer accuracy. The control device 101 sets the maximum value of the variable output from each of the neurons of the engine model 210 before transformation, as "M" (upper limit of variable output from each neuron). Further, the control device 101 sets the minimum value of the variable output from each of the neurons of the engine model 210 before transformation, as "m" (lower limit of variable output from each neuron).

$$f(x) \leq M(1-\delta) \quad (4)$$

$$f(x) \geq \varepsilon + (m-\varepsilon)\delta \quad (5)$$

The binary variable δ is used, whereby "y" may be expressed as formula (6) below.

$$y = (1-\delta)f(x) \quad (6)$$

Inequalities equivalent to formula (6) above are, for example, inequalities (7) to (10) below.

$$y \leq M(1-\delta) \quad (7)$$

$$y \geq m(1-\delta) \quad (8)$$

$$y \leq f(x) - m\delta \quad (9)$$

$$y \geq f(x) - M\delta \quad (10)$$

The control device 101, for example, applies the transformations to all the ReLU functions described above and thereby, transforms the engine model 210.

An engine model 220 is an example of the transformed engine model Mc and is a transformed engine model, which is the engine model 210 that has been transformed. The engine model 220 receives inputs of multiple driving conditions and operation amounts of the engine E and outputs a future controlled amount. FIG. 2BB depicts an extracted portion of the engine model 220.

The control device 101 sets a weight coefficient and bias (for example, $b_1$) of each neuron (for example, the node 201) of the engine model 220 before transformation, as a weight coefficient and bias of each neuron of the engine model 220 after transformation. Further, the control device 101 sets upper and lower limits of a variable (for example, u) input to the engine model 220 before transformation, as upper and lower limits of a variable input to the engine model 220 after transformation. Further, the control device 101 sets upper and lower limits of a variable (for example, y) output from the engine model 220 before transformation, as upper and lower limits of a variable output from the engine model 220 after transformation.

As a result, the control device 101 may obtain the transformed engine model 220, which is the engine model 210 that has been transformed. The engine model 220 enables use of an algorithm capable of high-speed problem (mixed integer programming problem) solving and therefore, enables suppression of the computation load. Further, the problem space may be limited, whereby the solution space is reduced and the search time may be shortened.

Nonetheless, the transformation of the engine model 210 may be performed by another computer different from that of the control device 101. In this instance, the control device 101, for example, obtains the engine model 220 after transformation by a user input operation or receives the transformed engine model 220 from another computer.

The control device 101 obtains the driving conditions of the engine E and an actual value of the controlled amount. Driving conditions of the engine E, for example, are the engine rotation speed and fuel injection amount. The controlled amount, for example, is the intake manifold pressure (MAP). The actual value of the controlled amount, for example, is obtained from a sensor that is provided in the engine E and measures the controlled amount.

The control device 101 identifies a target value of the controlled amount, based on the driving conditions of the engine E. In particular, for example, the control device 101 refers to a two-dimensional map (not depicted) and identifies a target value of the controlled amount corresponding to the driving conditions of the engine E. The two-dimensional map is information indicating target values of the controlled amount correlated with engine driving conditions (for example, combination of engine rotation speed and fuel injection amount). The target value of the controlled amount, for example, is a value of a suitable controlled amount to reduce emissions and fuel consumption.

The control device 101 uses the transformed engine model Mc to calculate an estimate value of a future controlled amount, from the driving conditions of the engine E and candidate values of an operation amount for controlling the controlled amount. The estimate value of a future controlled amount, for example, represents a controlled amount at the next step (1 second later, etc.) when the engine E is controlled. Candidate values of the operation amount, for example, are random values.

The control device 101 determines a value of the operation amount for controlling the controlled amount, based on an error between the identified target value of the controlled amount and the calculated estimate value of the controlled amount. In particular, for example, the control device 101, by an optimization solver sv, uses the transformed engine model Mc while changing the candidate values of the operation amount and calculates an estimate value of a future controlled amount.

The optimization solver sv, for example, is a software that uses a dual-simplex algorithm to solve problems. Further, the control device 101, for example, may determine, as the value of the operation amount for controlling the controlled amount at the next step, a candidate value for an instance when the error between the target value of the controlled amount and the estimate value of the controlled amount is minimized.

Further, when the operation amount for making the controlled amount become the target value changes abruptly, for example, the actuator may break down. Therefore, the control device 101 may determine the value of the operation amount for controlling the controlled amount, based on the error between the target value of the controlled amount and the estimate value of the controlled amount, and the amount of change of the operation amount.

Here, the amount of change of the operation amount, for example, is expressed by a difference of the current operation amount value (current value) and a candidate value of the operation amount. To explain in more detail, for example, the control device 101 uses an evaluation function ef to calculate a control evaluation value from the error between the target value of the controlled amount and the estimate value of the controlled amount and to calculate the amount of change of the operation amount.

The evaluation function ef, for example, is a cost function that weights a term that takes the error between the target value of the controlled amount and the estimate value of the controlled amount into consideration and a term that takes the amount of change of the operation amount into consideration. The evaluation function ef is weighted by, for example, normalizing for comparison of the amount of change of the operation amount and the error between the target value of the controlled amount and the estimate value of the controlled amount, and is weighting according to the priority of each term.

The control evaluation value, for example, corresponds to the cost for controlling the controlled amount and indicates a higher evaluation the lower is the value. Further, the control device 101 determines, as the value of the operation amount for controlling the controlled amount at the next step, a candidate value of the operation amount minimizing the control evaluation value (cost). As a result, the value of the operation amount for bringing the controlled amount as close as possible to the target value without causing an abrupt change in the operation amount may be determined. Nonetheless, the evaluation function ef may be, for example, a cost function that includes consideration only in terms of the error between the target value of the controlled amount and the estimate value of the controlled amount.

The control device 101 outputs the determined value of the operation amount. In particular, for example, the control device 101 outputs the determined value of the operation amount to the engine E as the operation amount when the controlled amount is controlled at the next step.

In this manner, according to the control device 101, highly accurate, high-speed engine control may be realized using a model (the transformed engine model Mc) capable of predicting dynamic characteristics of the engine E with high accuracy. For example, the multi-layered neural network engine model is converted into a formula using a linear inequality function, whereby optimization problems may be solved analytically. Further, an activation function that may be transformed into a linear inequality function, for example, is a ReLU, Hadlims, Satlins, tribas, etc. Of these activation functions, an activation function of the ReLU structure is used in the engine model, whereby highly accurate prediction of dynamic characteristics (controlled amount) of the engine E may be realized.

An example of hardware configuration of the control device 101 is described. FIG. 3 is a block diagram depicting an example of the hardware configuration of the control device 101. In FIG. 3, the control device 101 has a central processing unit (CPU) 301, a memory 302, a disk drive 303, a disk 304, a communications interface (I/F) 305, a removable recording medium I/F 306, and a removable recording medium 307. Further, the components are connected to one another by a bus 300.

Here, the CPU 301 governs overall control of the control device 101. The CPU 301 may have multiple cores. The memory 302 includes, for example, a read-only memory (ROM), a random access memory (RAM), and a flash ROM, etc. In particular, for example, the flash ROM stores OS programs, the ROM stores application programs, and the RAM is used as a work area of the CPU 301. Programs stored in the memory 302 are loaded onto the CPU 301, whereby encoded processes are executed by the CPU 301.

The disk drive 303 controls the reading and writing of data with respect to the disk 304, under the control of the CPU 301. The disk 304 stores the data written thereto under the control of the disk drive 303. The disk 304 may be, for example, a magnetic disk, an optical disk, etc.

The communications I/F 305 is connected to a network 310 through a communications line is connected to an external computer (for example, an actual engine system ES depicted in later-described FIG. 4) via the network 310. Further, the communications I/F 305 implements an interface between the network 310 and the device and controls the input and output of data with respect to an external computer. As the communications I/F 305, for example, a modem, a LAN adapter, etc. may be adopted.

The removable recording medium I/F 306 controls the reading and writing of data with respect to the removable recording medium 307, under the control of the CPU 301. The removable recording medium 307 stores therein data written thereto under the control of the removable recording medium I/F 306. The removable recording medium 307 may be, for example, a Compact Disc (CD)-ROM, a Digital Versatile Disk (DVD), a Universal Serial Bus (USB) memory, etc.

In addition to the components above, the control device 101 may have, for example, an input apparatus, a display, etc. Further, of the components described above, the control device 101, for example, may omit the disk drive 303, the disk 304, the removable recording medium I/F 306, and/or the removable recording medium 307.

Figure 4:
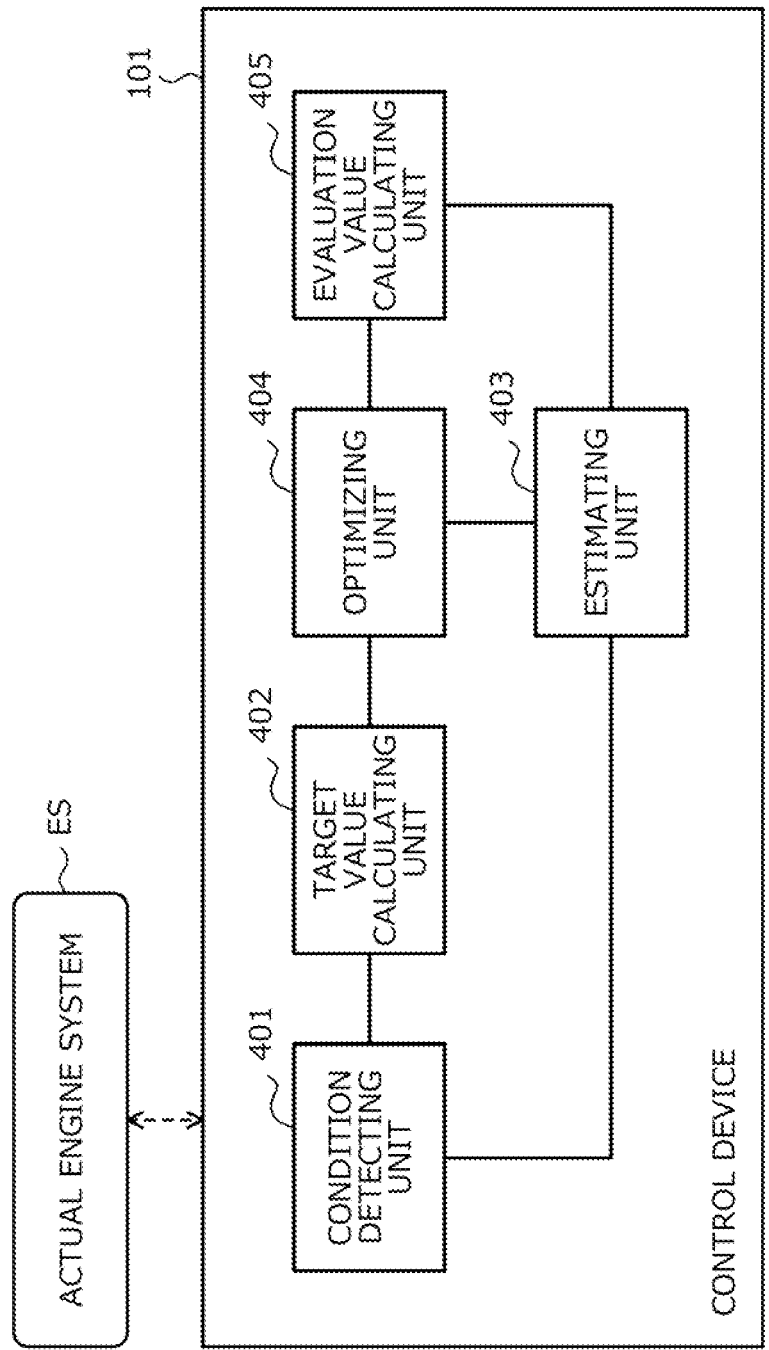
FIG. 4 is a block diagram depicting an example of a functional configuration of the control device 101 according to a first embodiment.

FIG. 4 is a block diagram depicting an example of a functional configuration of the control device 101 according to the first embodiment. In FIG. 4, the control device 101 includes a condition detecting unit 401, a target value calculating unit 402, an estimating unit 403, an optimizing unit 404, and an evaluation value calculating unit 405. The condition detecting unit 401 to the evaluation value calculating unit 405 are functions constituting a controller and in particular, for example, are implemented by executing on the CPU 301, a program stored in a storage apparatus such as the memory 302, the disk 304, and the removable recording medium 307 depicted in FIG. 3, etc., or by the communications I/F 305. Processing results of the functional units, for example, are stored to a storage apparatus such as the memory 302, the disk 304, etc.

The condition detecting unit 401 obtains driving conditions of the engine E under control and the actual value of a controlled amount. Here, the driving conditions of the engine E, for example, are the engine rotation speed and the fuel injection amount. The controlled amount, for example, is at least any one of the intake manifold pressure (MAP), the intake air volume (MAF), and the intake manifold oxygen concentration.

In particular, for example, the condition detecting unit 401 obtains the driving conditions of the engine E (current value) and the actual value of the controlled amount (current value), from the actual engine system ES. The actual engine system ES is a system for controlling the engine E and includes, for example, a controller, sensor, actuator, etc. The sensor, for example, measures the actual value of the controlled amount.

The target value calculating unit 402 identifies a control target value of the controlled amount of the engine E, based on the obtained driving conditions of the engine E. In particular, for example, the target value calculating unit 402 refers to a two-dimensional map (not depicted) and identifies a control target value of the controlled amount according to the driving conditions of the engine E. The two-dimensional map, for example, maps combinations of engine rotation speed and fuel injection amount, thereby indicating the control target value of the controlled amount. The control target value of the controlled amount is, for example, a suitable value of the controlled amount to suppress emission and fuel consumption.

The estimating unit 403 uses the transformed engine model Mc calculate an estimate value of a future controlled amount from the obtained driving conditions of the engine E and a search value of the operation amount. Here, the operation amount is, for example, the operation amount for controlling the controlled amount of the actuator. The operation amount may be, for example, at least any one of the turbo position, the throttle position, and the EGR position.

The search value of the operation amount is a candidate value of the operation amount for controlling the controlled amount. The search value of the operation amount, for example, is searched for in advance according to a search rule by the optimizing unit 404 and is provided to the estimating unit 403 by the optimizing unit 404. The estimate value of a future controlled amount represents, for example, the controlled amount at the next step when the engine E is controlled.

The transformed engine model Mc is obtained by transforming the engine model M (for example, refer to FIGS. 2A and 2B). The engine model M has a multilayer neural structure and an activation function of the ReLU structure and is a model that receives input of a driving condition and operation amount of the engine E and predicts dynamic characteristics of the engine E.

The engine model M is, for example, is a model that receives input of multiple driving conditions and operation amounts of the engine E and outputs an estimate value of a future controlled amount. The multiple driving conditions and operation amounts are, for example, driving conditions and operation amounts at each step from a past point (for example, four steps before) to the current time.

The transformed engine model Mc is a model for which a weight coefficient, bias, and upper and lower limits of an input/output variable are set for each neuron based on the engine model M and for which the activation function of each neuron is transformed using a linear inequality function containing a binary variable. The engine model M, for example, is created in advance and stored to a storage apparatus such as the memory 302, the disk 304, etc.

In particular, for example, based on the engine model M, the estimating unit 403 sets the weight coefficient and bias of each neuron of the engine model M before transformation, as the weight coefficient and bias of each neuron of the transformed engine model Mc. Further, the estimating unit 403 sets the upper and lower limits of the variable input to the engine model M, as the upper and lower limits of the variable input to the transformed engine model Mc.

Further, the estimating unit 403 sets the upper and lower limits of the variable output from the engine model M, as the upper and lower limits of the variable output from the transformed engine model Mc. Further, the estimating unit 403 sets the upper and lower limits of the variable output from each neuron of the engine model M, as the upper and lower limits of the variable output from each neuron (activation function) of the transformed engine model Mc.

The upper and lower limits of the input/output variable are obtained, for example, by providing a chirp signal or an APRBS signal as input to the engine model M and are set based on the maximum value and the minimum value of each input/output variable. A chirp signal is a sinusoidal signal that continuously changes a frequency component thereof according to the time of day. An APRBS signal is a random combination of square amplitudes. An exhaustive test pattern is realized by a chirp signal or APRBS signal, thereby enabling accurate setting of upper and lower limits of the input/output variable. Further, a range of the input/output variable is suitably set, whereby a high speed, high performance model (the engine model Mc) may be generated.

Nonetheless, transformation of the engine model M may be performed by the control device 101 or may be performed by another computer different from that of the control device 101. In an instance in which the transformation is performed by another computer, the control device 101, for example, obtains the transformed engine model Mc by a user input operation or receives the transformed engine model Mc from the other computer.

In particular, for example, the estimating unit 403 inputs the driving conditions of the engine E and the search value of the operation amount into the transformed engine model Mc and thereby, calculates an estimate value of a future controlled amount. To explain in more detail, for example, the estimating unit 403 inputs the driving conditions (past values) and operation amounts (past values) for a previous k-th step (where k is a natural number of 2 or more) to one step before and the driving conditions (current values) and the search value of the operation amount into the transformed engine model Mc and thereby, calculates an estimate value of the controlled amount for one step later. The driving conditions (past values) and operation amounts (past values) of each past step, for example, are stored in a storage apparatus such as the memory 302, the disk 304, etc.

At this time, the estimating unit 403 may calculate an estimate value of the controlled amount for a period (for example, 4 seconds) into the future from the current time. For example, one step is assumed to be "1 second" and the period into the future from the current time is assumed to be "4 seconds". In this instance, the estimating unit 403 calculates an estimate value of the controlled amount for each of the four subsequent steps.

Here, to calculate an estimate value of the controlled amount for each step, the driving condition at each step, for example, is fixed to a driving condition (current value). Further, the optimizing unit 404 retrieves, in advance, a combination pattern of search values of operation amounts of each step according to a search rule and provides the combination pattern to the estimating unit 403.

The optimizing unit 404 determines the value of the operation amount for controlling the controlled amount, based on the error between the control target value of the controlled amount and the calculated estimate value of the controlled amount. In particular, for example, the optimizing unit 404 may determine, as the value of the operation amount for controlling the controlled amount at the next step, a search value for an instance in which the error between the control target value of the controlled amount and the estimate value of the controlled amount is minimized.

Further, the optimizing unit 404 may determine the value of the operation amount for controlling the controlled amount, based on the error between the control target value of the controlled amount and the estimate value of the controlled amount, and the amount of change of the operation amount. Here, the amount of change of the operation amount is expressed by, for example, the difference of the current operation amount value (current value) and the search value of the operation amount.

In particular, for example, the evaluation value calculating unit 405 calculates a control evaluation value for each search value of the operation amount, based on the error between the control target value of the controlled amount and the estimate value of the controlled amount, and the amount of change of the operation amount. The control evaluation value is an indicator value that represents the cost for controlling the controlled amount. For example, the lower is the value of the control evaluation value, the higher is the evaluation.

To explain in more detail, for example, the evaluation value calculating unit 405 uses the evaluation function ef to calculate a control evaluation value for each search value of the operation amount. The evaluation function ef is, for example, a cost function that weights a term that takes the error between the control target value of the controlled amount and the estimate value of the controlled amount into consideration and a term that takes the amount of change of the operation amount into consideration (for example, refer to FIG. 1).

Further, the optimizing unit 404, for example, determines the value of the operation amount for controlling the controlled amount from among search values of the operation amount, based on the calculated control evaluation value. To explain in more detail, for example, the optimizing unit 404 determines, as the value of the operation amount for controlling the controlled amount, the search value for which the control evaluation value is smallest of the search values of the operation amount.

The search for the operation amount by the optimization unit 404 may be performed, for example, until the amount of change in the smallest control evaluation value substantially disappears or may be performed for a specified number of iterations.

Further, an estimate value of the controlled amount may be calculated for a period into the future from the current time. For example, one step is assumed to be "1 second" and the period into the future from the current time is assumed to be "4 seconds". In this instance, the optimizing unit 404 uses the evaluation function ef to calculate control evaluation values for each combination pattern of the search values of the operation amounts for each of the four subsequent steps.

Further, for each combination pattern, the optimizing unit 404 calculates a sum (or average) of the control evaluation values calculated for each step. Subsequently, the optimizing unit 404 identifies a combination pattern for which the calculated sum (or average) of the control evaluation values is smallest of the combination patterns. Further, the optimizing unit 404 may determine, as the value of the operation amount for controlling the controlled amount, the search value of the operation amount of one step (next step) in the identified combination pattern.

As a result, abrupt changes in the operation amount are suppressed and accuracy in determining the operation amount for making the controlled amount as close as possible to the control target value may be enhanced.

Further, the optimizing unit 404 outputs the determined value of the operation amount. In particular, for example, the optimizing unit 404 outputs the determined value of the operation amount to the actual engine system ES, as the operation amount when the controlled amount is controlled at the next step. The actual engine system ES controls the engine E based on the value of the operation amount output from the control device 101 (the optimizing unit 404).

In particular, for example, in the actual engine system ES, the operation amount (for example, the turbo position) of the next step is adjusted, by the actuator under the control of the controller, to the value output for the operation amount. As a result, the controlled amount of the engine E (for example, intake manifold pressure) is controlled.

Further, the activation function of the ReLU structure included in the engine model M, for example, may be a Leaky ReLU structure. The Leaky ReLU structure is a function that varies the output value linearly in both an instance in which the input value to the function is 0 or less and an instance in which the input value is greater than 0, and for which the slope differs at a border of 0. The activation function included in the engine model M is set as a Leaky activation function of the ReLU structure, whereby the accuracy in predicting dynamic characteristics of the engine E may be enhanced.

The control device 101, for example, may be implemented by an autonomous driving control unit of an automobile (controlled object). The autonomous driving control unit, for example, is an engine control unit (ECU). Further, the control device 101 may be implemented by another computer capable of communicating with the autonomous driving control unit of the automobile (controlled object). The other computer may be, for example, a server, a smartphone, a personal computer (PC), etc. Further, the control device 101 may be implemented by, for example, a programmable logic device (PLD) such as FPGA or an application-specific IC such as a standard cell or structured application specific integrated circuit (ASIC).

Here, prediction accuracy of dynamic characteristics of the engine E may decrease due to drift (deviation of measured value) resulting from modeling error of the transformed engine model Mc and/or sensor degradation.

Figure 5:
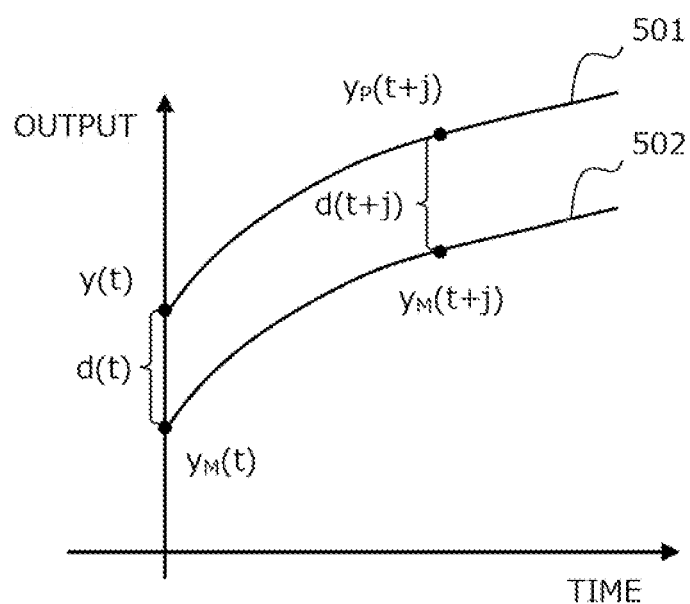
FIG. 5 is a diagram depicting temporal variation of a controlled amount.

FIG. 5 is a diagram depicting temporal variation of the controlled amount. In FIG. 5, curve 501 indicates actual values of temporal variation of the controlled amount. Curve 502 indicates estimate values of temporal variation of the controlled amount. "d(t)" indicates error between curves 501, 502 at time t. "d(t)", for example, represents error occurring due to the effects of modeling error and/or sensor degradation.

Thus, the estimating unit 403 may calculate an estimate value of a future controlled amount with consideration of the error between the actual value of the controlled amount (current value) at the current time and the estimate value of the controlled amount for the current time. The estimate value of the controlled amount for the current time is the estimate value of the controlled amount for the current time, estimated before the current time.

In particular, for example, the estimating unit 403 may use formula (11) below to calculate an estimate value of a future controlled amount. Where, $y_p(t+j)$ represents the estimate value of the controlled amount. "y(t)" represents the actual value of the controlled amount at the current time. "$y_M(t+j)$" represents the estimate value of the controlled amount for a step that is j steps after. "$y_M(t)$" represents the estimate value of the controlled amount for the current time, estimated before the current time.

$$y_p(t+j)=y(t)+y_M(t+j)-y_M(t) \quad (11)$$

As a result, the effects of modeling error and sensor degradation may be taken into consideration and decreases in the prediction accuracy of dynamic characteristics of the engine E may be prevented.

A procedure of a control process of the control device 101 is described.

Figure 6:
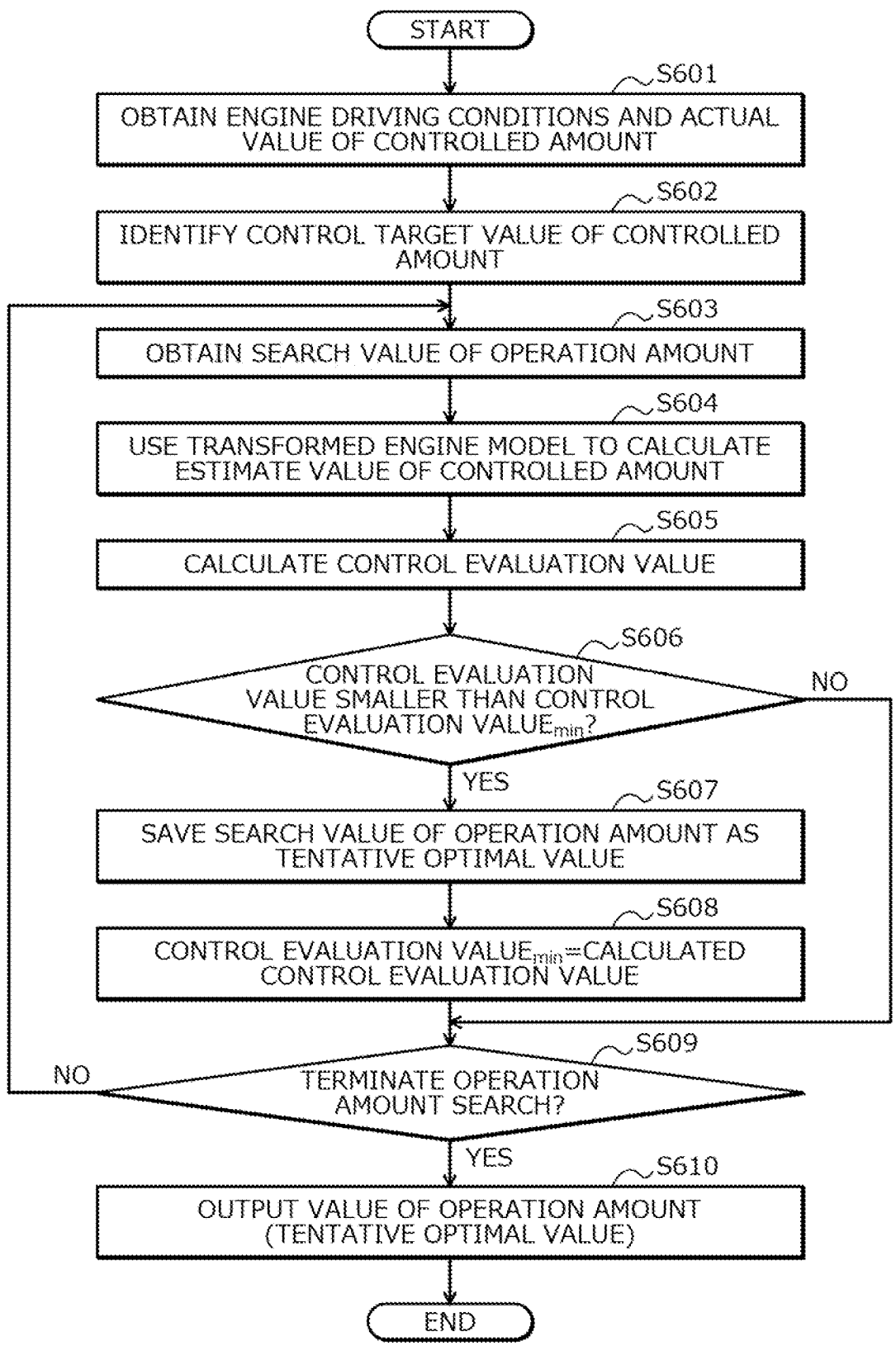
FIG. 6 is a flowchart depicting an example of a procedure of control processes of the control device 101 according to the first embodiment.

FIG. 6 is a flowchart depicting an example of a procedure of control processes of the control device 101 according to the first embodiment. In the flowchart depicted in FIG. 6, first, the control device 101 obtains driving conditions of the engine E under control and the actual value of the controlled amount (step S601). Subsequently, the control device 101 identifies a control target value of the controlled amount of the engine E, based on the obtained driving conditions of the engine E (step S602).

Next, the control device 101 obtains a search value of the operation amount for controlling the controlled amount (step S603). Further, the control device 101 uses the transformed engine model Mc to calculate an estimate value of a future controlled amount from the obtained driving conditions of the engine E and search value of the operation amount (step S604).

Next, the control device 101 uses the evaluation function of to calculate a control evaluation value from the error between the control target value of the controlled amount and the estimate value of the controlled amount, and the amount of change of the operation amount (step S605). The amount of change of the operation amount, for example, is expressed by the difference of the current value of the operation amount and the search value of the operation amount.

Subsequently, the control device 101 judges whether the calculated control evaluation value is smaller than a control evaluation value$_{min}$ (step S606). The control evaluation value$_{min}$ is "null" in an initial state. At step S606, when the control evaluation value$_{min}$ is in the initial state, the control device 101 transitions to step S607.

Here, when the control evaluation value is at least equal to the control evaluation value$_{min}$ (step S606: NO), the control device 101 transitions to step S609. On the other hand, when the control evaluation value is less than the control evaluation value$_{min}$ (step S606: YES), the control device 101 saves the obtained search value of the operation amount as a tentative optimal value (step S607).

Further, the control device 101 sets the calculated control evaluation value as the control evaluation value$_{min}$ (step S608). Next, the control device 101 judges whether to terminate the operation amount search (step S609). The operation amount search, for example, is performed until the amount of change of the control evaluation value$_{min}$ substantially disappears or for a specified number of iterations.

Here, when the operation amount search is not to be terminated (step S609: NO), the control device 101 returns to step S603. On the other hand, when the operation amount search is to be terminated (step S609: YES), the control device 101 outputs the value of the operation amount, which is the saved tentative optimal value, to the actual engine system ES (step S610), thereby terminating a series of processes according to the present flowchart.

As a result, a controlled amount of the engine E (for example, intake manifold pressure (MAP), intake air volume (MAF), intake manifold oxygen concentration, etc.) may be controlled using a highly accurate, high-speed engine model (the transformed engine model Mc).

As described above, according to the control device 101 according to the first embodiment, driving conditions of the engine E under control and the actual value of the controlled amount are obtained, and an estimate value of a future controlled amount may be calculated from the driving conditions of the engine E and search value of the operation amount, by using the transformed engine model Mc, which is the engine model M that has been transformed. The engine model M has a multilayer neural structure and an activation function of the ReLU structure and is a model that receives input of a driving condition and operation amount of the engine E and predicts dynamic characteristics of the engine E. The transformed engine model Mc is a model for which a weight coefficient, bias, and upper and lower limits of an input/output variable of each neuron (node) are set based on the engine model M and for which an activation function of each neuron has been transformed using a linear inequality function containing a binary variable. Further, according to the control device 101, the value of the operation amount for controlling the controlled amount may be determined based on the error between the control target value of the controlled amount and the estimate value of the controlled amount, and the determined value of the operation amount may be output.

As a result, the control device 101 may realize high performance and high-speed engine control using an engine model (the transformed engine model Mc) capable of accurately predicting dynamic characteristics of the engine E. For example, by suitably controlling the intake manifold pressure (MAP), intake air volume (MAF), intake manifold oxygen concentration, etc. of an automobile, the engine E may be controlled in real-time to suppress emission and/or fuel consumption.

Further, according to the control device 101, the value of the operation amount for controlling the controlled amount may be determined based on the error between the control target value of the controlled amount and the estimate value of the controlled amount, and the difference of the current value of the operation amount and the search value of the operation amount. In particular, for example, the control device 101 uses the evaluation function of to calculate, for each search value of the operation amount, a control evaluation value that represents the cost for controlling the controlled amount. Further, from among the search values of the operation amount, the control device 101 determines the value of the operation amount for controlling the controlled amount, based on the control evaluation value.

As a result, the control device 101 abrupt changes in the operation amount are suppressed and the operation amount for making the controlled amount as close as possible to the control target value may be determined.

Further, according to the control device 101, at least any one of the intake manifold pressure (MAP), the intake air volume (MAF), and the intake manifold oxygen concentration may be set as a controlled amount.

As a result, the control device 101 may adjust the intake manifold pressure (MAP), the intake air volume (MAF), the intake manifold oxygen concentration, etc. to control the engine E.

Further, according to the control device 101, the driving conditions of the engine E may be set as the engine rotation speed and the fuel injection amount.

As a result, the control device 101 may obtain the control target value of the controlled amount from the engine rotation speed and the fuel injection amount of the engine E.

Further, according to the control device 101, at least any one of the turbo position, the throttle position, and the EGR position may be set as an operation amount.

As a result, the control device 101 may adjust the turbo position, the throttle position, the EGR position, etc. to control the intake manifold pressure (MAP), the intake air volume (MAF), the intake manifold oxygen concentration, etc. The turbo position is, for example, an operation amount for controlling the intake manifold pressure (MAP). The throttle position is, for example, an operation amount for controlling the intake air volume (MAF). The EGR position is, for example, an operation amount for controlling the intake manifold oxygen concentration.

Further, according to the control device 101, the activation function included in the engine model M may be a Leaky activation function of the ReLU structure.

As a result, the control device 101 may enhance the accuracy in predicting dynamic characteristics of the engine E.

Next, the control device 101 according to a second embodiment is described. In the second embodiment, with consideration an instance in which the prediction accuracy of dynamic characteristics of the engine E decreases due to environmental changes, aging of the engine E, etc., an instance of updating the transformed engine model Mc is described. Portions similar to those described in the first embodiment are given the same reference characters used in the first embodiment and description thereof is omitted hereinafter.

First, an example of a functional configuration of the control device 101 is described.

Figure 7:
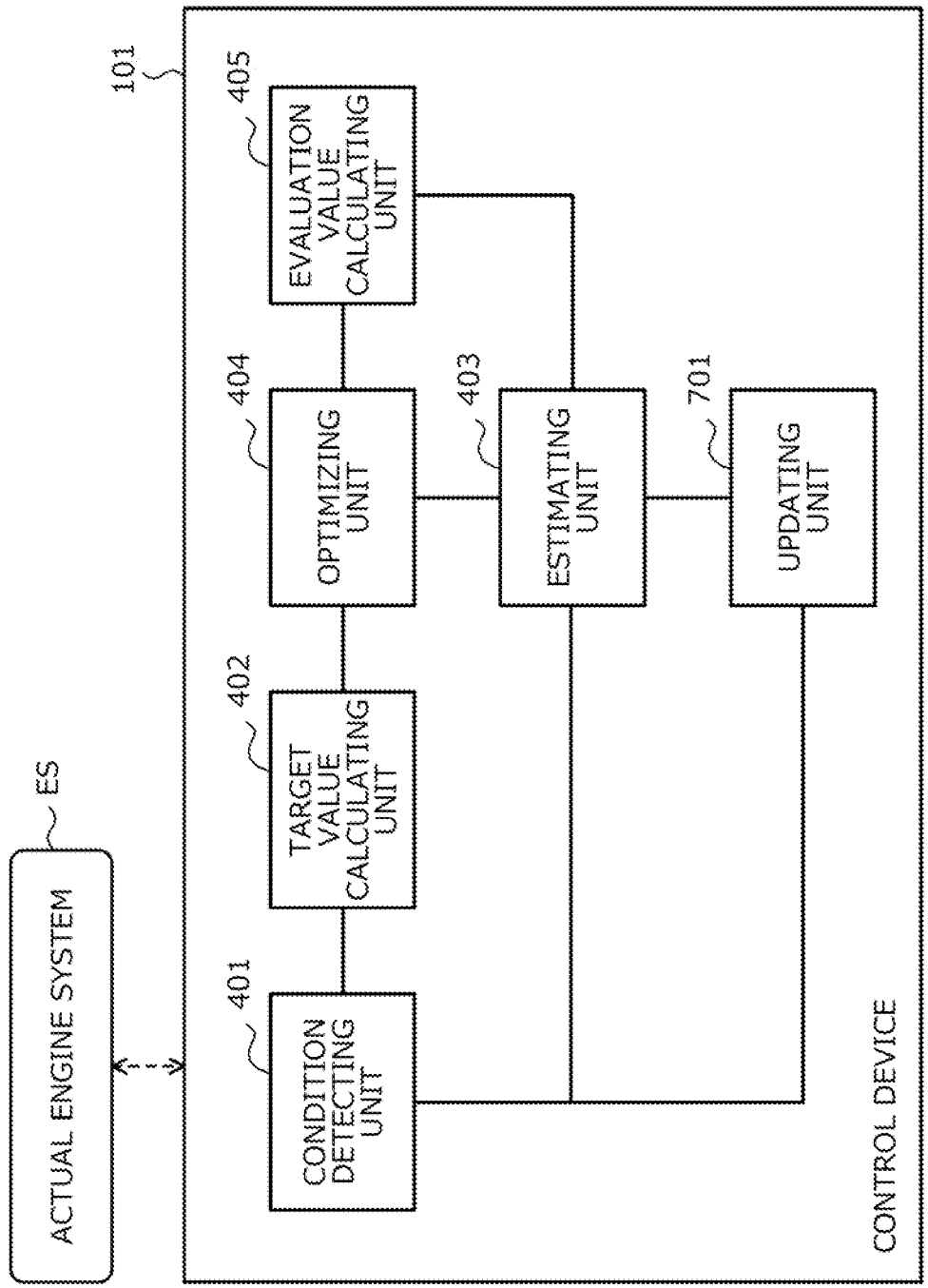
FIG. 7 is a block diagram depicting an example of a functional configuration of the control device 101 according to the second embodiment.

FIG. 7 is a block diagram depicting an example of a functional configuration of the control device 101 according to the second embodiment. In FIG. 7, the control device 101 includes the condition detecting unit 401, the target value calculating unit 402, the estimating unit 403, the optimizing unit 404, the evaluation value calculating unit 405, and an updating unit 701. The condition detecting unit 401 to the evaluation value calculating unit 405 and the updating unit 701 are functions constituting a controller and in particular, for example, are implemented by executing on the CPU 301, a program stored in a storage apparatus such as the memory 302, the disk 304, and the removable recording medium 307 depicted in FIG. 3, etc., or by the communications I/F 305. Processing results of the functional units, for example, are stored to a storage apparatus such as the memory 302, the disk 304, etc.

Hereinafter, functional units different from those of the control device 101 according to the first embodiment are described.

The updating unit 701 updates the transformed engine model Mc, based on training data that indicates the actual value of the controlled amount that corresponds to a combination of a driving condition of the engine E and a value of an operation amount. Here, the combination of a driving condition of the engine E and a value of an operation amount is, for example, a combination of a driving condition (current value) at time t and an output value of an operation amount.

The output value of an operation amount is a value (for example, lowest cost search value) of the operation amount output to the actual engine system ES from the control device 101 at time t. The actual value of the controlled amount is, for example, the actual value of the controlled amount one step after control is performed according to the output value of the operation amount. Nonetheless, for example, the actual value of the controlled amount at the current time (time t) may be used as the actual value of the controlled amount.

The training data, for example, is created and stored to a storage apparatus such as the memory 302, the disk 304, etc. each time the engine E (the actual engine system ES) is controlled by the control device 101.

In particular, for example, the updating unit 701 calculates the error between the actual value of the controlled amount (current value) obtained by the condition detecting unit 401 and the estimate value of the controlled amount calculated by the estimating unit 403. The estimate value compared with the actual value of the controlled amount (current value) may be the estimate value of the controlled amount (estimate value when the cost is lowest) calculated previously. Alternatively, the actual value of the controlled amount compared with the estimate value of the controlled amount may be the actual value of the controlled amount one step after control is performed according to the current output value of the operation amount.

Further, the updating unit 701 judges whether the calculated error is at least equal to a threshold. The threshold may be set arbitrarily. Here, when the error is less than the threshold, the updating unit 701 refrains from updating the transformed engine model Mc. On the other hand, when the error is at least equal to the threshold, the updating unit 701 updates the transformed engine model Mc, based on the training data.

To explain in more detail, for example, when the error is at least equal to the threshold, the updating unit 701 performs machine learning based on the training data and thereby, updates the weight coefficient and bias of each neuron of the transformed engine model Mc so that error between the estimate value of the controlled amount and the actual value thereof decreases. Further, the updating unit 701 obtains the largest input/output value of each neuron of each layer during learning and when a value exceeds an existing largest value for a neuron, the updating unit 701 updates the largest input/output value of that neuron. Similarly, the updating unit 701 obtains the smallest input/output value of each neuron of each layer during learning and when a value is smaller than an existing smallest value for a neuron, the updating unit 701 updates the smallest input/output value of that neuron.

When the transformed engine model Mc is updated, the estimating unit 403 uses the updated transformed engine model Mc to calculate an estimate value of a future controlled amount from the obtained driving condition of the engine E and search value of the operation amount.

Next, a procedure of the control processes of the control device 101 is described.

Figure 8:
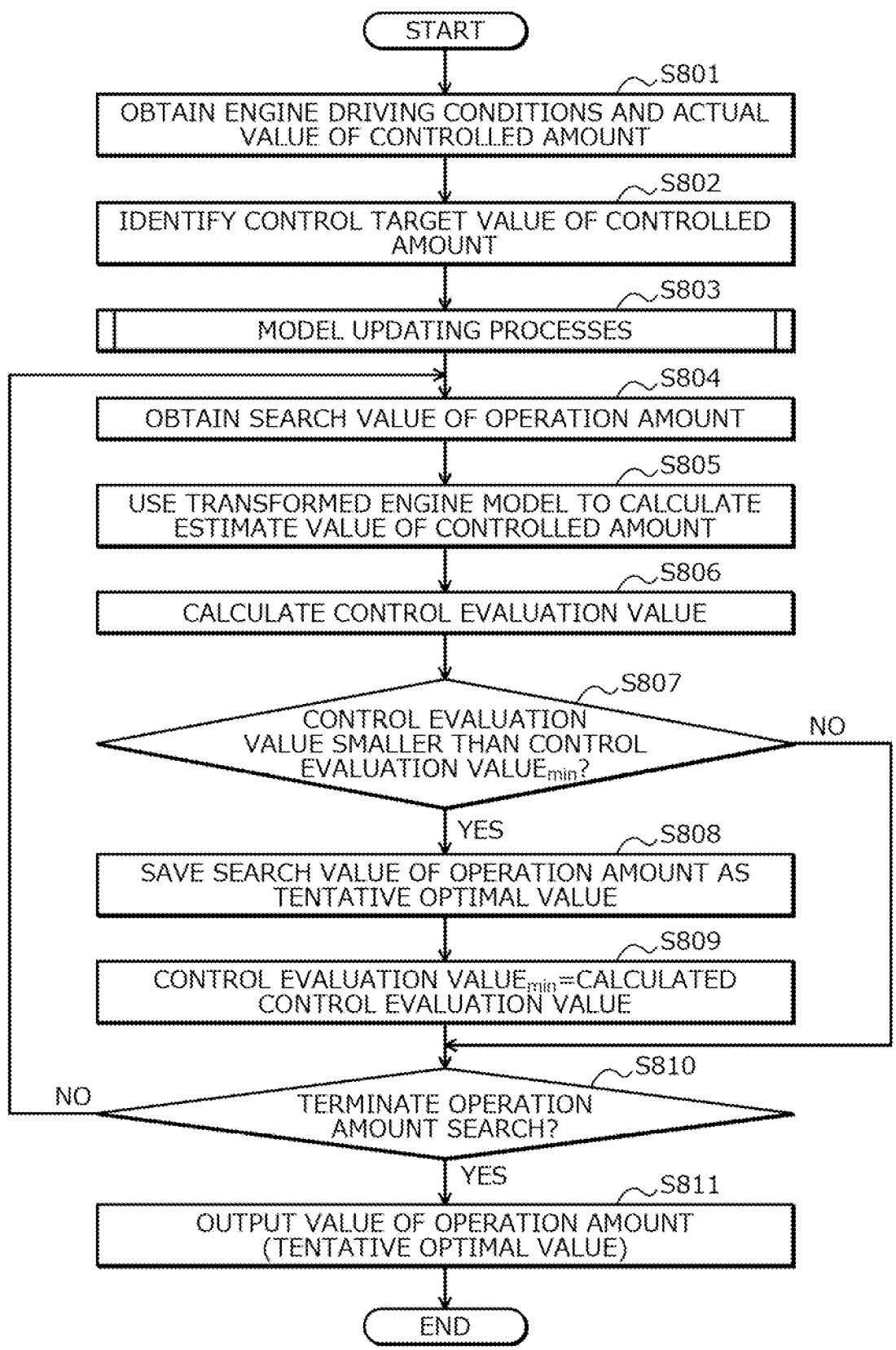
FIG. 8 is a flowchart depicting an example of a procedure of the control processes of the control device 101 according to a second embodiment.

FIG. 8 is a flowchart depicting an example of a procedure of the control processes of the control device 101 according to the second embodiment. In the flowchart depicted in FIG. 8, first, the control device 101 obtains driving conditions of the engine E under control and the actual value of the controlled amount (step S801). Subsequently, the control device 101 identifies a control target value of the controlled amount of the engine E, based on the obtained driving conditions of the engine E (step S802).

Next, the control device 101 executes model updating processes (step S803). The model updating processes are processes for updating the transformed engine model Mc. A procedure of the model updating processes is described in detail hereinafter with reference to FIG. 9.

Next, the control device 101 obtains a search value of the operation amount for controlling the controlled amount (step S804). Further, the control device 101 uses the transformed engine model Mc to calculate an estimate value of a future controlled amount, from the obtained driving conditions of the engine E and the search value of the operation amount (step S805).

Next, the control device 101 uses the evaluation function of to calculate a control evaluation value, from the error between the control target value of the controlled amount and the estimate value of the controlled amount, and the amount of change of the operation amount (step S806). The amount of change of the operation amount, for example, is expressed by the difference of the current value of the operation amount and the search value of the operation amount.

Subsequently, the control device 101 judges whether the calculated control evaluation value is smaller than the control evaluation value$_{min}$ (step S807). The control evaluation value$_{min}$ is "null" in the initial state. At step S807, when the control evaluation value$_{min}$ is in the initial state, the control device 101 transitions to step S808.

Here, when the control evaluation value is at least equal to the control evaluation value$_{min}$ (step S807: NO), the control device 101 transitions to step S810. On the other hand, when the control evaluation value is less than the control evaluation value$_{min}$ (step S807: YES), the control device 101 saves the obtained search value of the operation amount as a tentative optimal value (step S808).

Subsequently, the control device 101 sets the calculated control evaluation value as the control evaluation value$_{min}$ (step S809). Next, the control device 101 judges whether to terminate the operation amount search (step S810). The operation amount search, for example, is performed until the amount of change of the control evaluation value$_{min}$ substantially disappears or for a specified number of iterations.

Here, when the operation amount search is not to be terminated (step S810: NO), the control device 101 returns to step S804. On the other hand, when the operation amount search is to be terminated (step S810: YES), the control device 101 outputs the value of the operation amount, which is the saved tentative optimal value, to the actual engine system ES (step S811), thereby terminating a series of processes according to the present flowchart.

As a result, the controlled amount of the engine E may be controlled using a highly accurate, high-speed engine model (the transformed engine model Mc). Further, the transformed engine model Mc may be updated successively.

Next, a procedure of the model updating processes at step S803 are described in detail with reference to FIG. 9.

Figure 9:
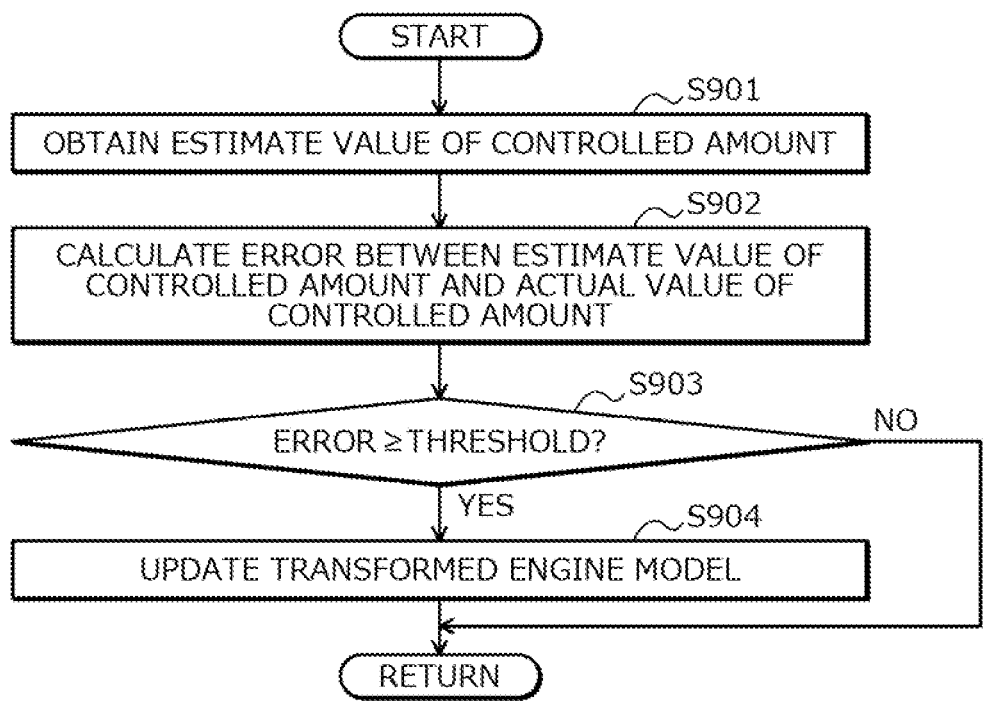
FIG. 9 is a flowchart depicting an example of a procedure of model updating processes.

FIG. 9 is a flowchart depicting an example of a procedure of the model updating processes. In the flowchart depicted in FIG. 9, first, the control device 101 obtains the estimate value of the controlled amount that is calculated using the transformed engine model Mc (step S901). The estimate value, for example, may be the estimate value of the controlled amount (estimate value when the cost is lowest) calculated during the previous control. Further, the control device 101, for example, may obtain a search value of the operation amount for controlling the controlled amount and may use the transformed engine model Mc to calculate and thereby obtain an estimate value of the controlled amount, from the obtained driving conditions of the engine E and the search value of the operation amount.

Next, the control device 101 calculates the error between the obtained estimate value of the controlled amount and the actual value of the controlled amount (current value) obtained at step S801 (step S902). Subsequently, the control device 101 judges whether the calculated error is at least equal to a threshold (step S903).

Here, when the error is less than the threshold (step S903: NO), the control device 101 returns to the step that called up the model updating processes. On the other hand, when the error is at least equal to the threshold (step S903: YES), the control device 101 updates the transformed engine model Mc, based on the training data so that the error between the estimate value of the controlled amount and the actual value thereof decreases (step S904) and then, returns to the step that called up the model updating processes.

As a result, the transformed engine model Mc may be updated successively according to the error between the estimate value and the actual value (current value) of the controlled amount.

As described above, according to the control device 101 according to the second embodiment, the transformed engine model Mc is updated successively, whereby decreases in prediction accuracy due to environmental changes and aging of the engine E may be prevented.

Next, the control device 101 according to a third embodiment is described. In the third embodiment, an instance of correcting the predicted value of the controlled amount with consideration of a case in which the prediction accuracy of dynamic characteristics of the engine E decreases due to environmental changes and/or aging of the engine E is described. Portions identical to those in the first and second embodiments are given the same reference characters used in the first and second embodiments and description thereof is omitted hereinafter.

First, an example of a functional configuration the control device 101 is described.

Figure 10:
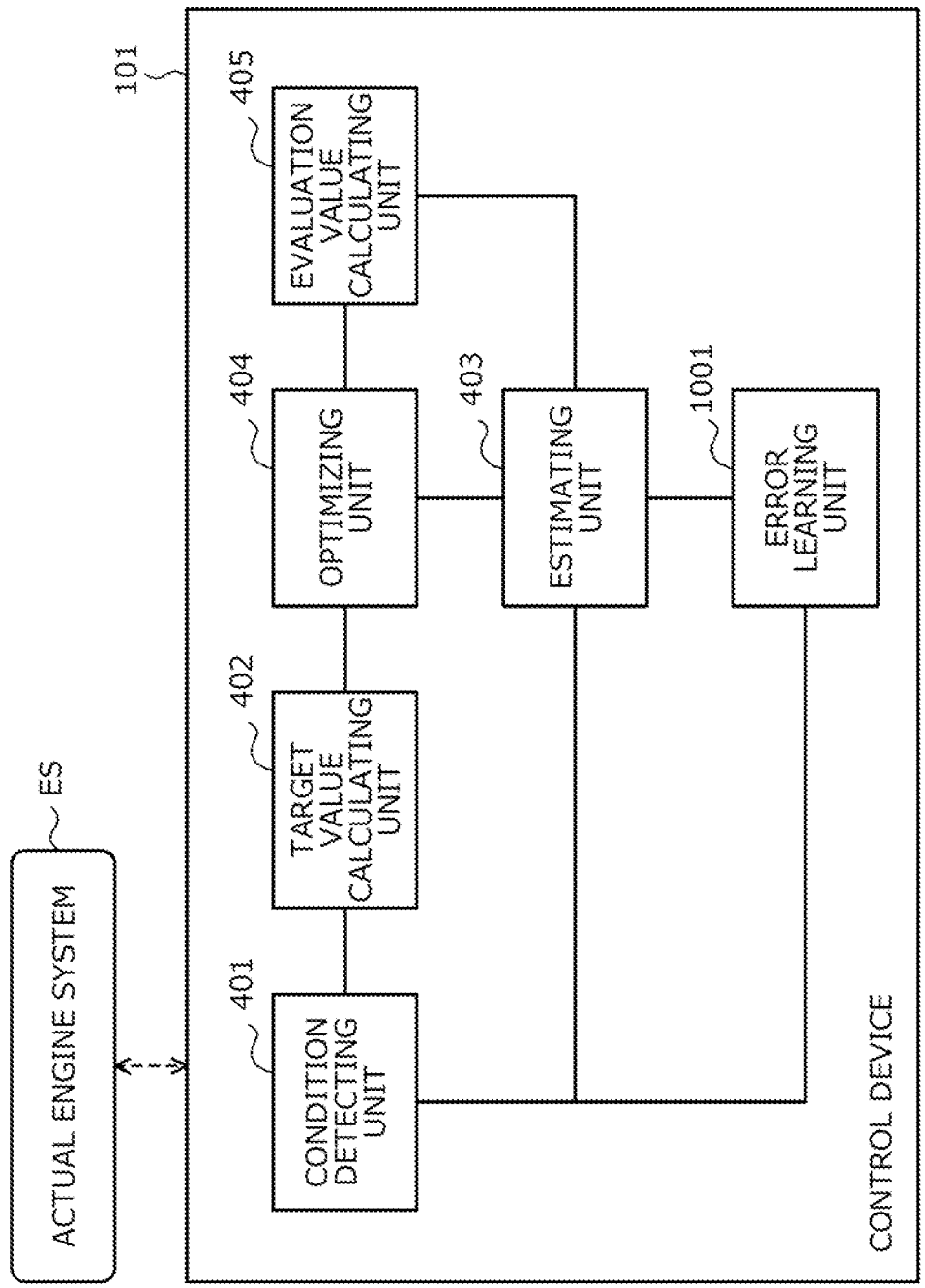
FIG. 10 is a block diagram depicting an example of a functional configuration of the control device 101 according to a third embodiment.

FIG. 10 is a block diagram depicting an example of a functional configuration of the control device 101 according to the third embodiment. In FIG. 10, the control device 101 includes the condition detecting unit 401, the target value calculating unit 402, the estimating unit 403, the optimizing unit 404, the evaluation value calculating unit 405, and an error learning unit 1001. The condition detecting unit 401 to the evaluation value calculating unit 405 and the error learning unit 1001 are functions constituting a controller and in particular, for example, are implemented by executing on the CPU 301, a program stored in a storage apparatus such as the memory 302, the disk 304, and the removable recording medium 307 depicted in FIG. 3, etc., or by the communications I/F 305. Processing results of the functional units, for example, are stored to a storage apparatus such as the memory 302, the disk 304, etc.

Hereinafter, functional units different from those of the control device 101 according to the first and second embodiments are described.

The estimating unit 403 refers to correction information that indicates correction values of the controlled amount corresponding to driving conditions of the engine E and corrects the calculated estimate value of the controlled amount. In particular, for example, the estimating unit 403 refers to an error learning table 1100 like that depicted in FIG. 11 and corrects the estimate value of the controlled amount.

The error learning table 1100, for example, may be prepared in advance or may be successively created and/or updated during control of the engine E by the control device 101. The error learning table 1100, for example, is implemented by a storage apparatus such as the memory 302, the disk 304, etc. Here, contents stored by the error learning table 1100 are described.

Figure 11:
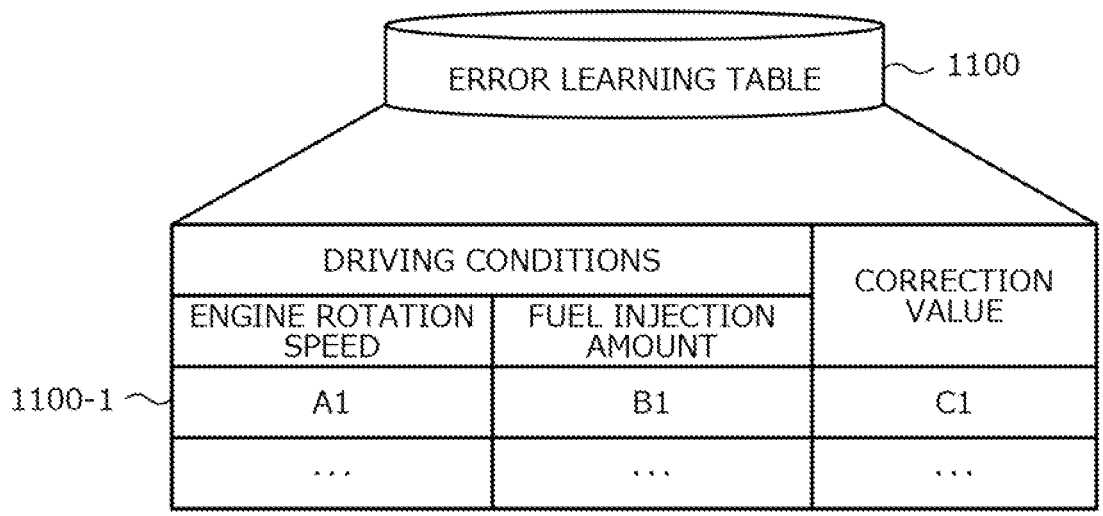
FIG. 11 is a diagram depicting an example of contents stored by an error learning table 1100.

FIG. 11 is a diagram depicting an example of contents stored by the error learning table 1100. In FIG. 11, the error learning table 1100 has fields for driving conditions (engine rotation speed, fuel injection amount) and correction values, and information is set in each of the fields, whereby the correction information (for example, correction information 1100-1) is stored as records.

Here, the driving conditions (engine rotation speed, fuel injection amount) are combinations of the engine rotation speed and fuel injection amount, which are driving conditions of the engine E. A correction value is a value for correcting the estimate value of the controlled amount of the engine E. For each combination of engine rotation speed and fuel injection amount, the error learning table 1100 stores a correction value that corresponds thereto.

For example, the obtained driving conditions of the engine E (current value) are assumed to be "engine rotation speed A1, fuel injection amount B1". In this instance, the estimating unit 403 refers to the error learning table 1100 and identifies correction value C1 that corresponds to the combination of the engine rotation speed A1 and the fuel injection amount B1. Subsequently, the error learning unit 1001 corrects the estimate value of the controlled amount by adding the identified correction value C1 to the calculated estimate value of the controlled amount.

In this instance, the optimizing unit 404 uses an error with respect to the corrected estimate value of the controlled amount to determine the value of the operation amount for controlling the controlled amount. In particular, for example, the optimizing unit 404 determines the value of the operation amount for controlling the controlled amount, based on the error between the control target value of the controlled amount and the corrected estimate value of the controlled amount, and the amount of change of the operation amount.

A correction value that corresponds to the driving conditions of the engine E (current value) may not be present in the error learning table 1100. In this instance, the estimating unit 403 may identify a correction value that corresponds to driving conditions that most closely resemble the driving conditions of the engine E (current value). Alternatively, the estimating unit 403 may use an interpolation process to obtain from the most closely resembling driving conditions, a correction value that corresponds to the driving conditions of the engine E (current value). Driving conditions mostly closely resembling the driving conditions (current values), for example, are driving conditions for which a sum of the error of the fuel injection amount and the error of the engine rotation speed is smallest among the driving conditions (current values). Further, in an instance in which no correction value corresponding to the driving conditions of the engine E (current value) is present, the estimating unit 403 may refrain from correcting the estimate value of the controlled amount.

The error learning unit 1001 learns the correction value of the controlled amount corresponding to driving conditions of the engine E. In particular, for example, the error learning unit 1001 calculates the error between the actual value of the controlled amount (current value) obtained by the condition detecting unit 401 and the estimate value of the controlled amount calculated by the estimating unit 403. Further, the error learning unit 1001 may calculate the error between the actual value of the controlled amount (current value) obtained by the condition detecting unit 401 and the corrected estimate value of the controlled amount after correction by the estimating unit 403.

The estimate value (or corrected estimate value) compared with the actual value of the controlled amount (current value) may be the estimate value of the controlled amount (estimate value when the cost is lowest) calculated previously. Alternatively, the actual value of the controlled amount compared to the estimate value of the controlled amount may be the actual value of the controlled amount one step after control is performed according to the current output value of the operation amount.

Subsequently, the error learning unit 1001 judges whether the calculated error is at least equal to a threshold. The threshold may be arbitrarily set. Here, when the error is at least equal to the threshold, the error learning unit 1001, for example, updates the error learning table 1100, based on the calculated error so that error between the estimate value of the controlled amount and the actual value thereof decreases. On the other hand, when the error is less than the threshold, the error learning unit 1001 refrains from updating the error learning table 1100.

To explain in more detail, for example, when the error is at least equal to the threshold, the error learning unit 1001 correlates and stores the error between the actual value of the controlled amount (current value) and the estimate value of the controlled amount (or the corrected estimate value) and the driving conditions of the engine E (current value) to the error learning table 1100. Here, when a past error correlated with the same driving conditions as the driving conditions of the engine E (current value) is present, the error learning unit 1001, for example, may correlate and store an average (may be a maximum value, a minimum value, etc.) of the past errors and the driving conditions of the engine E (current value) to the error learning table 1100.

Next, a procedure of the control processes of the control device 101 is described.

Figure 12:
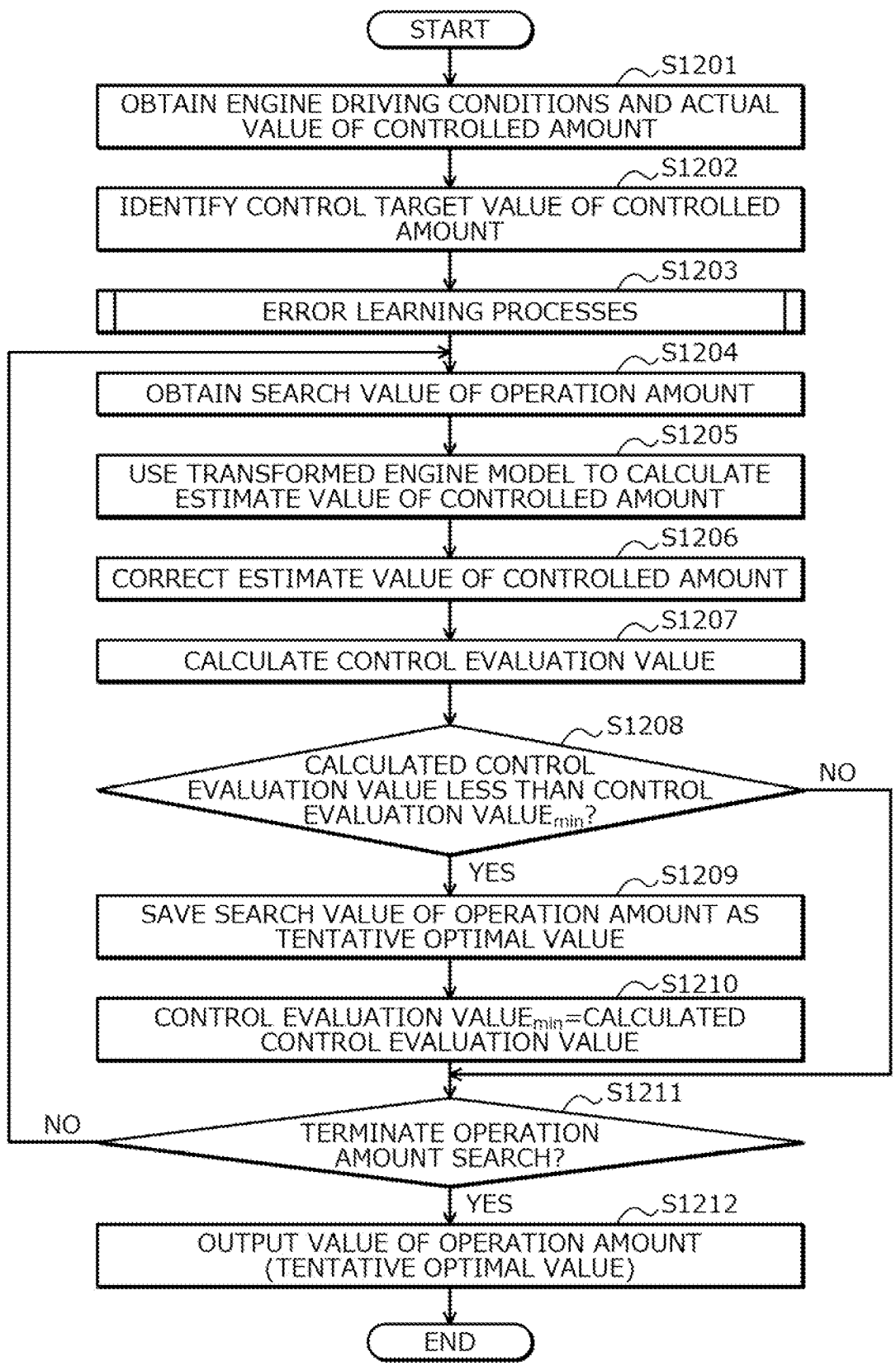
FIG. 12 is a flowchart depicting an example of a procedure of the control processes of the control device 101 according to the third embodiment.

FIG. 12 is a flowchart depicting an example of a procedure of the control processes of the control device 101 according to the third embodiment. In the flowchart depicted in FIG. 12, first, the control device 101 obtains the driving conditions of the engine E under control and the actual value of the controlled amount (step S1201). Subsequently, the control device 101 identifies a control target value of the controlled amount of the engine E, based on the obtained driving conditions of the engine E (step S1202).

Next, the control device 101 executes error learning processes (step S1203). The error learning processes are processes for updating the error learning table 1100. A procedure of the error learning processes is described in detail hereinafter with reference to FIG. 13.

Next, the control device 101 obtains a search value of the operation amount for controlling the controlled amount (step S1204). Further, the control device 101 uses the transformed engine model Mc to calculate an estimate value of a future controlled amount, from the obtained driving conditions of the engine E and the search value of the operation amount (step S1205).

Next, the control device 101 refers to the error learning table 1100 and corrects the calculated estimate value of the controlled amount (step S1206). In particular, for example, the control device 101 refers to the error learning table 1100 and identifies the correction value correlated with the driving conditions of the engine E obtained at step S1201. Subsequently, the control device 101 corrects the estimate value of the controlled amount by adding the identified correction value to the calculated estimate value of the controlled amount.

Next, the control device 101 uses the evaluation function of to calculate the control evaluation value from the error between the control target value of the controlled amount and the corrected estimate value of the controlled amount, and the amount of change of the operation amount (step S1207). The amount of change of the operation amount, for example, is expressed by the difference of the current value of the operation amount and the search value of the operation amount.

Further, the control device 101 judges whether the calculated control evaluation value is less than the control evaluation value$_{min}$ (step S1208). The control evaluation value$_{min}$ is "null" in the initial state. At step S1208, when the control evaluation value$_{min}$ is in the initial state, the control device 101 transitions to step S1209.

Here, when the control evaluation value is at least equal to the control evaluation value$_{min}$ (step S1208: NO), the control device 101 transitions to step S1211. On the other hand, when the control evaluation value is less than the control evaluation value$_{min}$ (step S1208: YES), the control device 101 saves the obtained search value of the operation amount as a tentative optimal value (step S1209).

Subsequently, the control device 101 sets the calculated control evaluation value as the control evaluation value$_{min}$ (step S1210). Next, the control device 101 judges whether to terminate the operation amount search (step S1211). The operation amount search, for example, is performed until the amount of change of the control evaluation value$_{min}$ substantially disappears or for a specified number of iterations.

Here, when the operation amount search is not to be terminated (step S1211: NO), the control device 101 returns to step S1204. On the other hand, when the operation amount search is to be terminated (step S1211: YES), the control device 101 outputs the value of the operation amount, which is the saved tentative optimal value, to the actual engine system ES (step S1212), thereby terminating a series of processes according to the present flowchart.

As a result, the controlled amount of the engine E may be controlled using a highly accurate, high-speed engine model (the transformed engine model Mc) and the error learning table 1100. Further, the error learning table 1100 may be updated successively.

Next, a procedure of the error learning processes at step S1203 is described in detail with reference to FIG. 13.

Figure 13:
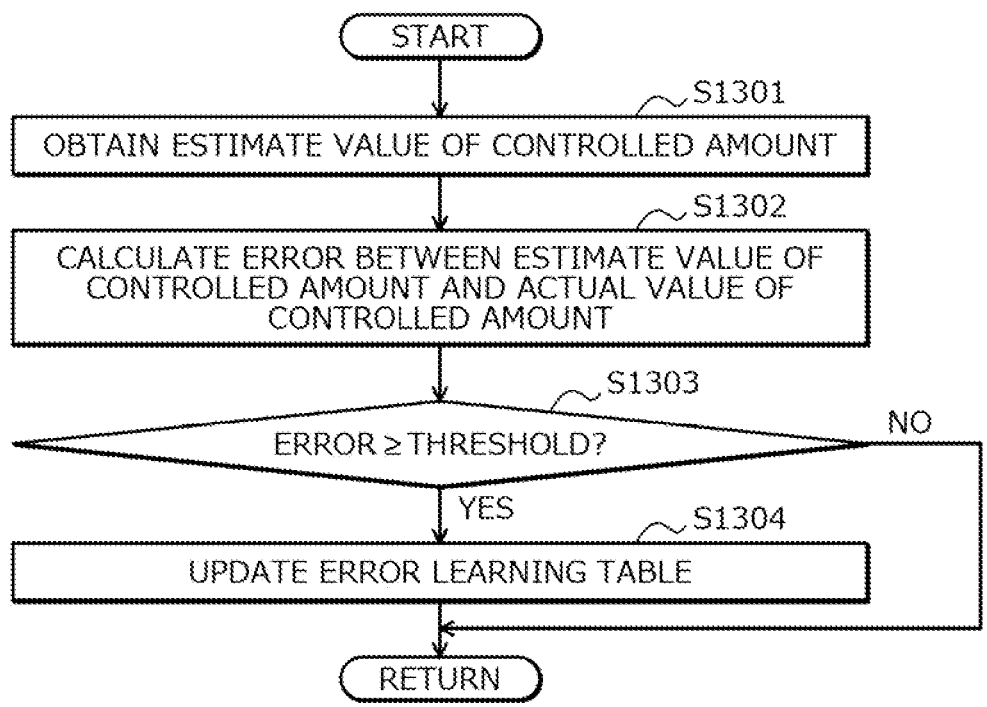
FIG. 13 is a flowchart depicting an example of a procedure of error learning processes.

FIG. 13 is a flowchart depicting an example of a procedure of the error learning processes. In the flowchart depicted in FIG. 13, first, the control device 101 obtains the estimate value of the controlled amount that is calculated using the transformed engine model Mc (step S1301). The estimate value, for example, may be the estimate value of the controlled amount (estimate value when the cost is lowest) calculated during the previous control. Further, the control device 101, for example, may obtain a search value of the operation amount for controlling the controlled amount and may use the transformed engine model Mc to calculate and thereby obtain an estimate value of the controlled amount from the obtained driving conditions of the engine E and search value of the operation amount. Further, the estimate value may be the corrected estimate value of the controlled amount, that is the estimate value calculated using the transformed engine model Mc and corrected using the error learning table 1100.

Next, the control device 101 calculates the error between the obtained estimate value of the controlled amount and the actual value of the controlled amount (current value) obtained at step S1201 (step S1302). Subsequently, the control device 101 judges whether the calculated error is at least equal to a threshold (step S1303).

Here, when the error is less than the threshold (step S1303: NO), the control device 101 returns to the step that called up the error learning processes. On the other hand, when the error is at least equal to the threshold (step S1303: YES), the control device 101 updates the error learning table 1100 so that the error between the estimate value of the controlled amount and the actual value thereof decreases (step S1304) and the control device 101 returns to the step that called up the error learning processes.

As a result, the error learning table 1100 may be updated successively according to the error between the estimate value of the controlled amount and the actual value (current value) thereof.

As described above, according to the control device 101 according to the third embodiment, the estimate value of the controlled amount calculated using the transformed engine model Mc may be corrected with consideration of environmental changes and/or aging of the engine E. As a result, decreases in prediction accuracy due to environmental changes and/or aging of the engine E may be prevented.

Next, the control device 101 according to a fourth embodiment is described. In the fourth embodiment, an instance is described in which at least any one of thermal efficiency, maximum pressure increase rate in cylinder, torque, combustion start position, combustion gravity center, exhaust gas (Nox, Soot, CO, HC, PM) is estimated as the controlled amount of the engine E. Portions identical to those of the first to third embodiments are given the same reference characters used in the first to third embodiments and description thereof is omitted hereinafter.

First, an example of the functional configuration of the control device 101 is described.

Figure 14:
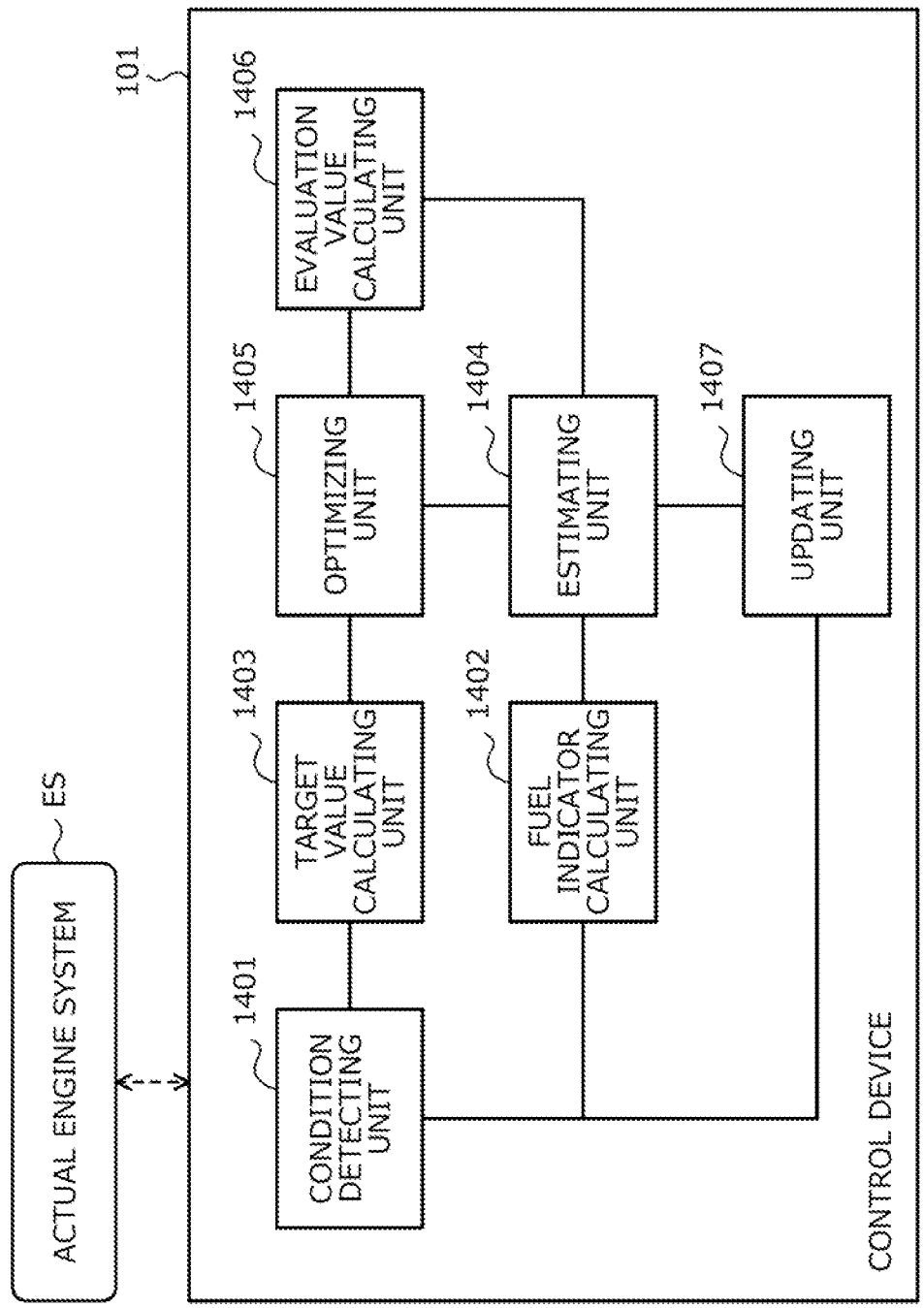
FIG. 14 is a block diagram depicting an example of a functional configuration of the control device 101 according to a fourth embodiment.

FIG. 14 is a block diagram depicting an example of a functional configuration of the control device 101 according to the fourth embodiment. In FIG. 14, the control device 101 includes a condition detecting unit 1401, a fuel indicator calculating unit 1402, a target value calculating unit 1403, an estimating unit 1404, an optimizing unit 1405, an evaluation value calculating unit 1406, and an updating unit 1407. The condition detecting unit 1401 to the updating unit 1407 are functions constituting a controller and in particular, for example, are implemented by executing on the CPU 301, a program stored in a storage apparatus such as the memory 302, the disk 304, and the removable recording medium 307 depicted in FIG. 3, etc., or by the communications I/F 305. Processing results of the functional units, for example, are stored to a storage apparatus such as the memory 302, the disk 304, etc.

The condition detecting unit 1401 obtains the driving conditions of the engine E under control and state amounts. Here, the driving conditions of the engine E are, for example, the engine rotation speed and fuel injection amount. The state amounts are, for example, excess air rate, fuel injection pressure, intake manifold pressure, intake manifold oxygen concentration, engine cylinder pressure, and exhaust gas (Nox, Soot, CO, HC, PM). In particular, for example, the condition detecting unit 1401 obtains the driving conditions of the engine E (current value) and the state amounts (current values) from the actual engine system ES.

The fuel indicator calculating unit 1402 calculates thermal efficiency, a maximum pressure increase rate in cylinders, torque, combustion start position, and combustion gravity center from the obtained engine cylinder pressure. Further, the fuel indicator calculating unit 1402 combines the calculated results and the obtained exhaust gas (Nox, Soot, CO, HC, PM) as a set to be a combustion indicator of the engine E. The combustion indicator of the engine E is used as the actual value of the controlled amount.

The target value calculating unit 1403 identifies a control target value of the engine E, based on the obtained driving conditions of the engine E. A control target value is, for example, the target thermal efficiency, the target maximum pressure increase rate in cylinders, the target torque, the target combustion start position, the target combustion gravity center, and the target exhaust gas (Nox, Soot, CO, HC, PM).

In particular, for example, the target value calculating unit 1403 refers to the two-dimensional map (not depicted) and identifies a control target value corresponding to the driving conditions of the engine E. The two-dimensional map, for example, indicates a control target value that corresponds to a combination of the engine rotation speed and the fuel injection amount.

The estimating unit 1404 uses a transformed engine model Mc' to estimate value of a future controlled amount from the obtained driving conditions of the engine E, state amounts, and search value of the operation amount. Here, the controlled amount is at least any one of thermal efficiency, maximum pressure increase rate in cylinders, torque, combustion start position, combustion gravity center, and exhaust gas (Nox, Soot, CO, HC, PM).

The operation amount is, for example, the operation amount for controlling the controlled amount and, for example, each fuel injection amount and each injection period of multi-stage injection (pre, pilot, main, after). The search value of the operation amount is a candidate value of the operation amount for controlling the controlled amount.

The search value of the operation amount, for example, is searched for in advance according to a predetermined search rule by the optimizing unit 1405 and is provided to the estimating unit 1404 by the optimizing unit 1405.

The transformed engine model Mc' is obtained by transforming an engine model M' (for example, refer to FIGS. 2A and 2B). The engine model M' has a multilayer neural structure and an activation function of the ReLU structure and is a model that receives input of a driving condition of the engine E, a state amount, and an operation amount and predicts dynamic characteristics of the engine E.

The engine model M', for example, is a model that receives input of multiple driving conditions, state amounts, and operation amounts of the engine E and outputs estimate values of a future controlled amount. The multiple driving conditions, state amounts, and operation amounts are, for example, driving conditions, state amounts, and operation amounts at each step from a past point past (for example, four steps before) to the current time.

To explain in more detail, for example, the engine model M' receives input of the engine rotation speed, the fuel injection amount, the excess air rate, the fuel injection pressure, the intake manifold pressure, the intake manifold oxygen concentration, and each fuel injection amount and each injection period of multi-stage injection (pre, pilot, main, after), and outputs the thermal efficiency, the maximum pressure increase rate in cylinders, the torque, the combustion start position, the combustion gravity center, and the exhaust gas (Nox, Soot, CO, HC, PM).

The transformed engine model Mc' is a model for which a weight coefficient, bias, and upper and lower limits of an input/output variable of each neuron are set based on the engine model M' and the activation function of each neuron is transformed using a linear inequality function containing a binary variable. The engine model M', for example, is created in advance and stored to a storage apparatus such as the memory 302, the disk 304, etc.

In particular, for example, based on the engine model M', the estimating unit 1404 sets the weight coefficient and bias of each neuron of the engine model M' before transformation thereof, as the weight coefficient and bias of each neuron of the transformed engine model Mc'. Further, the estimating unit 1404 sets the upper and lower limits of the variable input to the engine model M' as the upper and lower limits of the variable input to the transformed engine model Mc'.

Further, the estimating unit 1404 sets the upper and lower limits of the variable output from the engine model M' as the upper and lower limits of the variable output from the transformed engine model Mc'. Further, the estimating unit 1404 sets the upper and lower limits of the variable output from each neuron of the engine model M' as the upper and lower limits of the variable output from each neuron (activation function) of the transformed engine model Mc'.

The upper and lower limits of an input/output variable, for example, are obtained by providing a chirp signal or an APRBS signal to the engine model M' as input and are set based on the maximum value and the minimum value of each input/output variable. Details of the processing contents that transform the engine model M' are similar to the transform processes of the engine model M described using FIGS. 2A and 2B and thus, depiction and description thereof is omitted hereinafter. Further, transformation of the engine model M' may be performed at the control device 101 or may be performed at another computer different from that of the control device 101.

In particular, for example, the estimating unit 1404 inputs the driving conditions of the engine E, the state amounts, and the search values of the operation amount into the transformed engine model Mc' and thereby, calculates an estimate value of a future controlled amount. To explain in more detail, for example, the estimating unit 1404 inputs the driving conditions (past values), the state amounts (past values), the operation amounts (past values), the driving conditions (current values), the state amounts (current values), and the search values of the operation amount for a previous k-th step to one step before into the transformed engine model Mc' and thereby, calculates an estimate value of the controlled amount for one step later. The driving conditions (past values), the state amounts (past values), and the operation amounts (past values) of each past step, for example, are stored in a storage apparatus such as the memory 302, the disk 304, etc.

Here, the estimating unit 1404 may calculate an estimate value of the controlled amount for a period into the future from the current time (for example, a period of 4 seconds). For example, one step is assumed to be "1 second" and the period into the future from the current time is assumed to be "4 seconds". In this instance, the estimating unit 1404 calculates an estimate value of the controlled amount for each of the subsequent four steps.

Here, to calculate the estimate value of the controlled amount for each of the steps, the driving conditions and the state amounts for each step, for example, are fixed to the driving conditions (current values) and the state amounts (current values). Further, a combination pattern of the search values of the operation amount at each step is searched for in advance according to a search rule by the optimizing unit 1405 and is provided to the estimating unit 1404 by the optimizing unit 1405.

Further, the prediction accuracy of dynamic characteristics of the engine E may decrease as a result of drift (deviation of measured value) due to sensor degradation and/or modeling error of the transformed engine model Mc'. Therefore, the estimating unit 1404 may calculate an estimate value of a future controlled amount with consideration of the error between the estimate value of the controlled amount for the current time and the actual value of the controlled amount (current value) at the current time (for example, refer to FIG. 5).

In particular, for example, the estimating unit 1404 may use a formula such as formula (11) above to calculate an estimate value of a future controlled amount. For example, a fuel indicator (thermal efficiency, maximum pressure increase rate in cylinders, torque, combustion start position, combustion gravity center, exhaust gas (Nox, Soot, CO, HC, PM)) of the engine E obtained by the fuel indicator calculating unit 1402 is used as the actual value of the controlled amount.

The optimizing unit 1405 determines the value of the operation amount for controlling the controlled amount, based on the error between the control target value of the controlled amount and the calculated estimate value of the controlled amount. In particular, for example, the optimizing unit 1405 may determine, as the value of the operation amount for controlling the controlled amount at the next step, the search value for which the error between the control target value of the controlled amount and the estimate value of the controlled amount is smallest.

Further, the optimizing unit 1405 may determine the value of the operation amount for controlling the controlled amount, based on the error between the control target value of the controlled amount and the estimate value of the controlled amount, and the amount of change of the operation amount. Here, the amount of change of the operation amount, for example, is expressed by the difference of the current operation amount value (current value) and the search value of the operation amount.

In particular, for example, the evaluation value calculating unit 1406 calculates a control evaluation value for each search value of the operation amount, based on the error between the control target value of the controlled amount and the estimate value of the controlled amount, and the amount of change of the operation amount. The control evaluation value is an indicator value that represents the cost for controlling the controlled amount. The lower is the control evaluation value, for example, the higher is the evaluation.

To explain in more detail, for example, the evaluation value calculating unit 1406 uses the evaluation function ef' to calculate a control evaluation value for each search value of the operation amount. The evaluation function ef' is, for example, a cost function that weights a term that takes into consideration the error between the control target value of the controlled amount and the estimate value of the controlled amount and a term that takes the amount of change of the operation amount into consideration.

Further, the optimizing unit 1405, for example, determines the value of the operation amount for controlling the controlled amount from among search values of the operation amount, based on the calculated control evaluation value. To explain in more detail, for example, the optimizing unit 1405 determines, as the value of the operation amount for controlling the controlled amount, the search value for which the control evaluation value is smallest of the search values of the operation amount.

The search for the operation amount by the optimizing unit 1405 may be performed, for example, until the amount of change in the smallest control evaluation value substantially disappears or may be performed for a specified number of iterations.

Further, an estimate value of the controlled amount may be calculated for a period into the future from the current time. For example, one step is assumed to be "1 second" and the period into the future from the current time is assumed to be "4 seconds". In this instance, the optimizing unit 1405 uses the evaluation function ef' to calculate control evaluation values for each combination pattern of the search values of the operation amount for each of the subsequent four steps.

Further, for each combination pattern, the optimizing unit 1405 calculates a sum (or average) of the control evaluation values calculated for each step. Next, the optimizing unit 1405 identifies a combination pattern for which the calculated sum (or average) of the control evaluation values is smallest of the combination patterns. Further, the optimizing unit 1405 may determine, as the value of the operation amount for controlling the controlled amount, the search value of the operation amount of one step (next step) in the identified combination pattern.

As a result, abrupt changes in the operation amount are suppressed and accuracy in determining the operation amount for making the controlled amount as close as possible to the control target value may be enhanced.

Further, the optimizing unit 1405 outputs the determined value of the operation amount. In particular, for example, the optimizing unit 1405 outputs the determined value of the operation amount to the actual engine system ES, as the operation amount when the controlled amount is controlled at the next step The actual engine system ES controls the engine E based on the value of the operation amount output from the control device 101 (the optimizing unit 1405).

Further, the activation function of the ReLU structure included in the engine model M', for example, may be the Leaky ReLU structure. By setting the activation function included in the engine model M' to be the Leaky activation function of the ReLU structure, the accuracy in predicting dynamic characteristics of the engine E may be enhanced.

The updating unit 1407 updates the transformed engine model Mc', based on the training data that indicates the actual value of the controlled amount corresponding to the combination of the driving conditions of the engine E, the state amounts, and the value of the operation amount. Here, the combination of the driving conditions of the engine E, the state amounts, and the value of the operation amount is, for example, a combination of the driving conditions (current values) at time t, the state amounts (current values), and the output value of the operation amount.

The output value of the operation amount is the value (for example, lowest cost search value) of the operation amount output from the control device 101 to the actual engine system ES, at time t. A combustion indicator of the engine E obtained by the fuel indicator calculating unit 1402 is used as the actual value of the controlled amount. The actual value of the controlled amount is, for example, the actual value of the controlled amount one step after control is performed according to the output value of the operation amount. Nonetheless, for example, the actual value of the controlled amount at the current time (time t) may be used as the actual value of the controlled amount.

The training data, for example, is created and stored to a storage apparatus such as the memory 302, the disk 304, etc. each time the engine E (the actual engine system ES) is controlled by the control device 101.

In particular, for example, the updating unit 1407 calculates the error between the actual value of the controlled amount (current value) obtained by the condition detecting unit 1401 and the estimate value of the controlled amount calculated by the estimating unit 1404. The estimate value compared with the actual value of the controlled amount (current value) may be the estimate value of the controlled amount (estimate value when the cost is lowest) calculated previously. Alternatively, the actual value of the controlled amount compared with the estimate value of the controlled amount may be the actual value of the controlled amount one step after control is performed according to the current output value of the operation amount.

Further, the updating unit 1407 judges whether the calculated error is at least equal to a threshold. The threshold may be set arbitrarily. Here, when the error is less than the threshold, the updating unit 1407 refrains from updating the transformed engine model Mc'. On the other hand, when the error is at least equal to the threshold, the updating unit 1407 updates the transformed engine model Mc', based on the training data.

To explain in more detail, for example, when the error is at least equal to the threshold, the updating unit 1407 performs machine learning based on the training data and thereby, updates the weight coefficient and bias of each neuron of the transformed engine model Mc' so that error between the estimate value of the controlled amount and the actual value thereof decreases. Further, the updating unit 1407 obtains the largest input/output value of each neuron of each layer during learning and when a value exceeds an existing largest value for a neuron, the updating unit 1407 updates the largest input/output value of that neuron. Similarly, the updating unit 1407 obtains the smallest input/output value of each neuron of each layer during learning and when a value is smaller than an existing smallest value for a neuron, the updating unit 1407 updates the smallest input/output value of that neuron.

When the transformed engine model Mc' is updated, the estimating unit 1404 uses the updated transformed engine model Mc', to calculate an estimate value of a future controlled amount from the obtained driving conditions of the engine E, the state amounts, and the search values of the operation amount.

Of the functions described above, the control device 101 may omit the updating unit 1407. In this instance, as described in the third embodiment, the control device 101 may use the error learning table to correct a predicted value of the controlled amount. The error learning table stores correction values of controlled amounts corresponding to driving conditions of the engine E. The control device 101, for example, creates and/or successively updates the error learning table during control of the engine E. Nonetheless, correction processes using the error learning table and updating processes using the error learning table are similar to the correction processes using the error learning table 1100 and the updating processes using the error learning table 1100 described in the third embodiment and therefore, description thereof is omitted hereinafter.

Next, a procedure of the control processes of the control device 101 is described.

Figure 15:
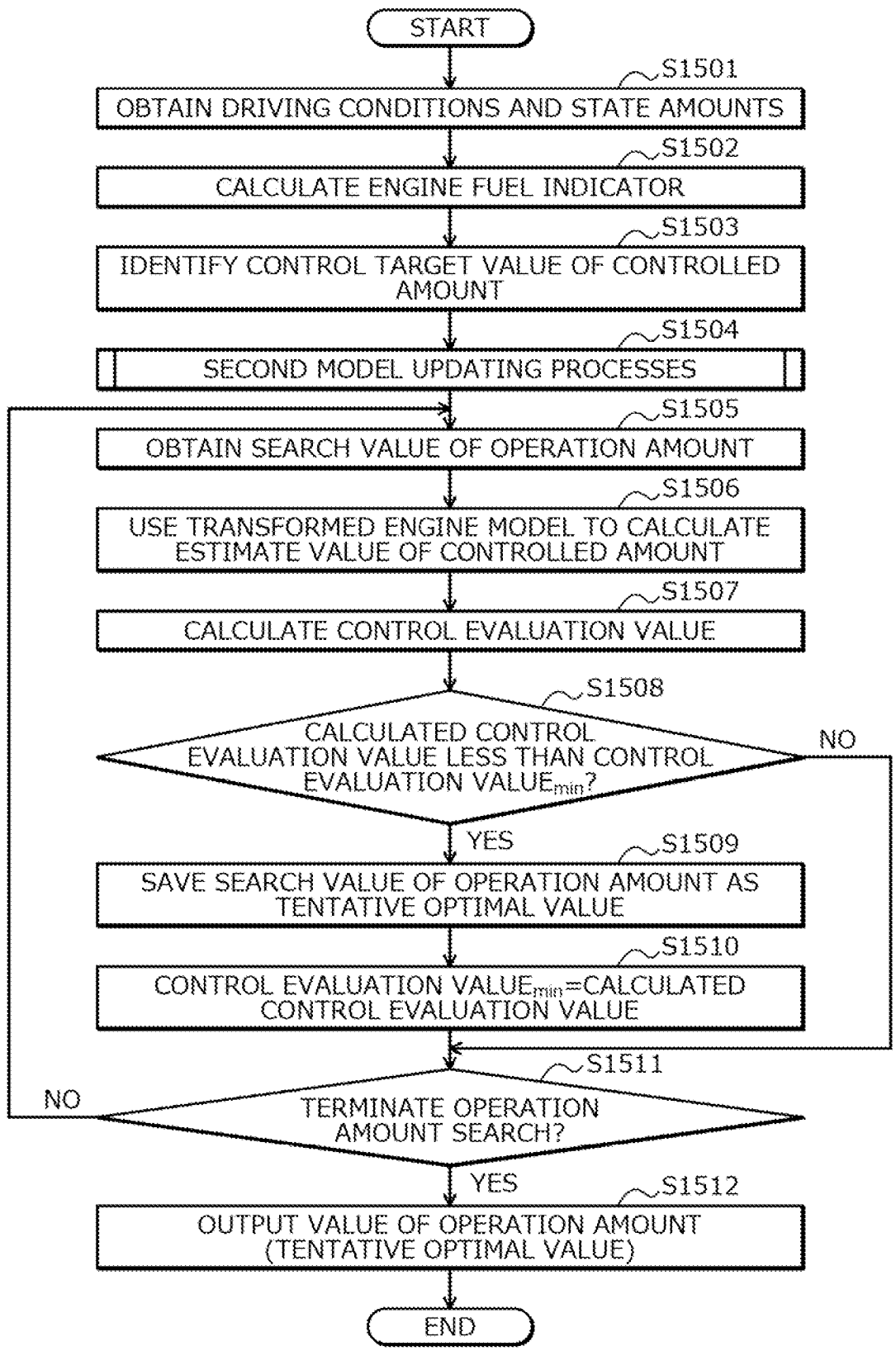
FIG. 15 is a flowchart depicting an example of the control processes of the control device 101 according to the fourth embodiment.

FIG. 15 is a flowchart depicting an example of the control processes of the control device 101 according to the fourth embodiment. In the flowchart depicted in FIG. 15, first, the control device 101 obtains the driving conditions of the engine E under control and the state amounts (step S1501). Next, the control device 101 calculates an engine fuel indicator from the obtained state amounts (engine cylinder pressure, exhaust gas) (step S1502). The combustion indicator of the engine E is used as the actual value of the controlled amount.

Subsequently, the control device 101 identifies a control target value of the controlled amount of the engine E, based on the obtained driving conditions of the engine E (step S1503). Next, the control device 101 executes second model updating processes (step S1504). The second model updating processes are processes for updating the transformed engine model Mc'. A procedure of the second model updating processes is described in detail hereinafter with reference to FIG. 16.

Next, the control device 101 obtains a search value of the operation amount for controlling the controlled amount (step S1505). Subsequently, the control device 101 uses the transformed engine model Mc' to calculate an estimate value of a future controlled amount from the obtained driving conditions of the engine E, the state amounts, and the search value of the operation amount (step S1506).

Next, the control device 101 uses the evaluation function ef' to calculate a control evaluation value from the error between the control target value of the controlled amount and the estimate value of the controlled amount, and the amount of change of the operation amount (step S1507). The amount of change of the operation amount is expressed by, for example, the difference of the current value of the operation amount and the search value of the operation amount.

Further, the control device 101 judges whether the calculated control evaluation value is less than the control evaluation value$_{min}$ (step S1508). The control evaluation value$_{min}$ is "null" in an initial state. At step S1508, when the control evaluation value$_{min}$ is in the initial state, the control device 101 transitions to step S1509.

Here, when the control evaluation value is at least equal to the control evaluation value$_{min}$ (step S1508: NO), the control device 101 transitions to step S1511. On the other hand, when the control evaluation value is less than the control evaluation value$_{min}$ (step S1508: YES), the control device 101 saves the obtained search value of the operation amount as a tentative optimal value (step S1509).

Subsequently, the control device 101 sets the calculated control evaluation value as the control evaluation value$_{min}$ (step S1510). Next, the control device 101 judges whether to terminate the operation amount search (step S1511). The operation amount search, for example, is performed until the amount of change of the control evaluation value$_{min}$ substantially disappears or for a specified number of iterations.

Here, when the operation amount search is not to be terminated (step S1511: NO), the control device 101 returns to step S1505. On the other hand, when the operation amount search is to be terminated (step S1511: YES), the control device 101 outputs the value of the operation amount, which is the saved tentative optimal value, to the actual engine system ES (step S1512), thereby terminating a series of processes according to the present flowchart.

As a result, a controlled amount of the engine E may be controlled using a highly accurate, high-speed engine model (the transformed engine model Mc'). Further, the transformed engine model Mc' may be successively updated.

Next, a procedure of the second model updating processes at step S1504 is described in detail with reference to FIG. 16.

Figure 16:
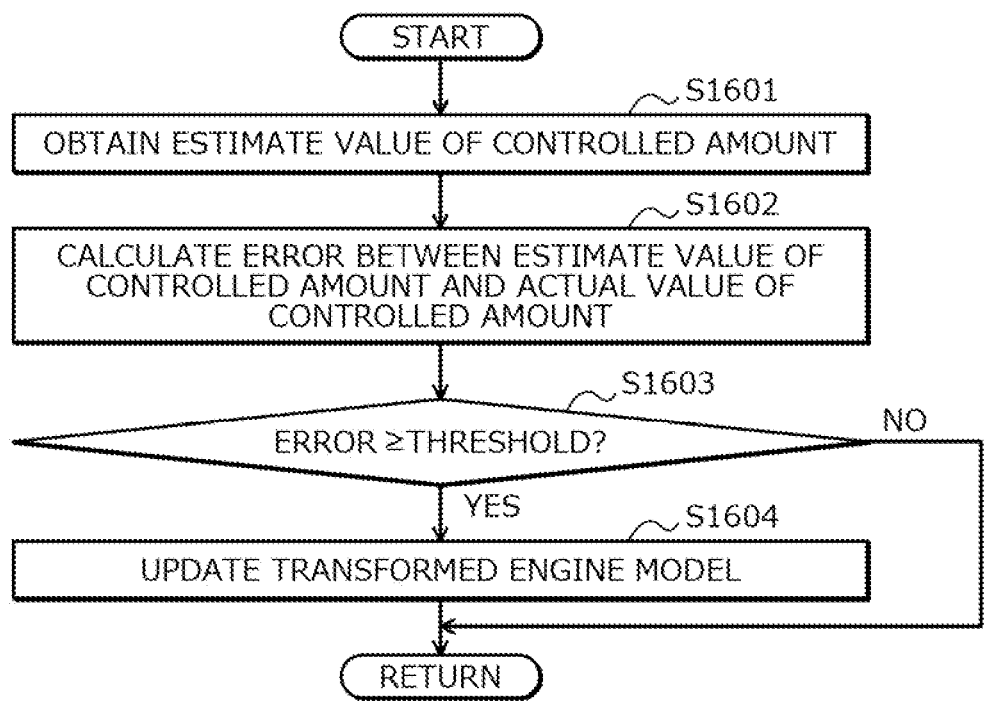
FIG. 16 is a flowchart depicting an example of a procedure of second model updating processes.

FIG. 16 is a flowchart depicting an example of a procedure of the second model updating processes. In the flowchart depicted in FIG. 16, first, the control device 101 obtains the estimate value of the controlled amount calculated using the transformed engine model Mc' (step S1601). The estimate value, for example, may be the estimate value of the controlled amount (estimate value when the cost is lowest) calculated during the previous control. Further, the control device 101, for example, may obtain a search value of the operation amount for controlling the controlled amount and may obtain an estimate value of the controlled amount by using the transformed engine model Mc' to calculate an estimate value from the obtained driving conditions of the engine E, state amounts, and search value of the operation amount.

Next, the control device 101 calculates the error between the obtained estimate value of the controlled amount and the actual value of the controlled amount (engine fuel indicator) calculated at step S1502 (step S1602). Subsequently, the control device 101 judges whether the calculated error is at least equal to a threshold (step S1603).

Here, when the error is less than the threshold (step S1603: NO), the control device 101 returns to the step that called up the second model updating processes. On the other hand, when the error is at least equal to the threshold (step S1603: YES), the control device 101 updates the transformed engine model Mc', based on the training data so that the error between the estimate value of the controlled amount and the actual value thereof decreases (step S1604) and then, returns to the step that called up the second model updating processes.

As a result, the transformed engine model Mc' may be updated successively according to the error between the estimate value of the controlled amount and the actual value (current value).

As described above, according to the control device 101 according to the fourth embodiment, high performance and high-speed engine control may be implemented using a model (the transformed engine model Mc') capable of accurately predicting dynamic characteristics of the engine E. For example, thermal efficiency, the maximum pressure increase rate in cylinders, torque, combustion start position, combustion gravity center, exhaust gas (Nox, Soot, CO, HC, PM), etc. of an automobile may be suitably controlled, whereby control of the engine E in real-time may be performed suppressing emission and/or fuel consumption. Further, the transformed engine model Mc' is successively updated, whereby decreases in prediction accuracy due to environmental changes and/or aging of the engine E may be prevented.

Thus, according to the control device 101 according to the first to fourth embodiments, control of the engine E in real-time may be performed suppressing emission and/or fuel consumption.

The embodiments described above may be combined and implemented within a range without contradiction. Further, the control method described in the present embodiments may be implemented by executing a prepared program on a computer such as a personal computer or a workstation. The program is stored to a non-transitory, computer-readable recording medium such as a hard disk, a flexible disk, a CD-ROM, a DVD, a USB memory, etc., and is read-out from the computer-readable recording medium and executed by the computer. Further, the present control program may be distributed through a network such as the Internet.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control device, comprising:
   a memory; and
   a processor coupled to the memory, the processor configured to:
      obtain a driving condition and an actual value of a controlled amount of an engine under control,
      calculate an estimate value of a future controlled amount, from the obtained driving condition and a candidate value of an operation amount for controlling the controlled amount, the processor using a transformed engine model to calculate the estimate value, the transformed engine model in which an activation function of each neuron is transformed using a linear inequality function having a binary variable, the transformed engine model for which a weight coefficient, bias, and upper and lower limits of an input/output variable of the each neuron are set based on an engine model that has a multilayer neural structure and the activation function of a ReLU structure, receives the driving condition and the operation amount of the engine as input, and predicts dynamic characteristics of the engine,
      determine a value of the operation amount for controlling the controlled amount, based on an error between the calculated estimate value of the controlled amount and a target value of the controlled amount identified from the driving condition, and
      output the determined value of the operation amount.

2. The control device according to claim 1, wherein the processor determines the value of the operation amount, based on the error between the target value of the controlled amount and the estimate value of the controlled amount, and a difference of a current value of the operation amount and the candidate value of the operation amount.

3. The control device according to claim 2, wherein the candidate value includes a plurality of candidate values, and
the processor:
   based on the error and the difference for each of the plurality of candidate values, calculates, for each of the plurality of candidate values, a control evaluation value that represents a cost for controlling the controlled amount, and
   based on the control evaluation value calculated for each of the plurality of candidate values, determines the value of the operation amount for controlling the controlled amount from among the plurality of candidate values of the operation amount.

4. The control device according to claim 1, wherein the controlled amount is at least any one of an intake manifold pressure, an intake air volume, and an intake manifold oxygen concentration.

5. The control device according to claim 4, wherein the driving condition includes an engine rotation speed and a fuel injection amount.

6. The control device according to claim 5, wherein the operation amount is at least any one of a turbo position, a throttle position, and an exhaust gas recirculation opening.

7. The control device according to claim 1, wherein the upper and lower limits of the input/output variable are set based on a maximum value and a minimum value of the input/output variable obtained by providing a chirp signal or an APRBS signal to the engine model as input.

8. The control device according to claim 1, wherein the activation function is a Leaky ReLU structure.

9. The control device according to claim 1, wherein the transformed engine model is updated based on training data that indicates the actual value of the controlled amount corresponding to a combination of the driving condition and the value of the operation amount.

10. The control device according to claim 1, wherein the processor is configured to:
   refer to correction information that indicates correspondence between a plurality of correction values of the controlled amount and a plurality of driving conditions of the engine, the processor identifying, among the plurality of correction values, a correction value that corresponds to the obtained driving condition,
   add the identified correction value to the calculated estimate value of the controlled amount and thereby, correct the estimate value of the controlled amount, and
   determine the value of the operation amount for controlling the controlled amount, based on an error between the target value of the controlled amount and the corrected estimate value of the controlled amount.

11. A computer-implemented control method, comprising:
obtaining a driving condition and an actual value of a controlled amount of an engine under control;
calculating an estimate value of a future controlled amount, from the obtained driving condition and a candidate value of an operation amount for controlling the controlled amount, the estimate value being calculated using a transformed engine model in which an activation function of each neuron is transformed using a linear inequality function having a binary variable, the transformed engine model for which a weight coefficient, bias, and upper and lower limits of an input/output variable of the each neuron are set based on an engine model that has a multilayer neural structure and the activation function of a ReLU structure, receives the driving condition and the operation amount of the engine as input, and predicts dynamic characteristics of the engine;

determining a value of the operation amount for controlling the controlled amount, based on an error between the calculated estimate value of the controlled amount and a target value of the controlled amount identified from the driving condition; and outputting the determined value of the operation amount.

12. A computer-readable recording medium storing therein a control program executable by one or more computers, the control program comprising:

an instruction for obtaining a driving condition and an actual value of a controlled amount of an engine under control;

an instruction for calculating an estimate value of a future controlled amount, from the obtained driving condition and a candidate value of an operation amount for controlling the controlled amount, the estimate value being calculated using a transformed engine model in which an activation function of each neuron is transformed using a linear inequality function having a binary variable, the transformed engine model for which a weight coefficient, bias, and upper and lower limits of an input/output variable of the each neuron are set based on an engine model that has a multilayer neural structure and the activation function of a ReLU structure, receives the driving condition and the operation amount of the engine as input, and predicts dynamic characteristics of the engine;

an instruction for determining a value of the operation amount for controlling the controlled amount, based on an error between the calculated estimate value of the controlled amount and a target value of the controlled amount identified from the driving condition; and an instruction for outputting the determined value of the operation amount.

\* \* \* \* \*